United States Patent
Yamauchi et al.

(10) Patent No.: US 8,233,708 B2
(45) Date of Patent: Jul. 31, 2012

(54) VIDEO SCENE CLASSIFICATION DEVICE AND VIDEO SCENE CLASSIFICATION METHOD

(75) Inventors: Masaki Yamauchi, Osaka (JP); Masayuki Kimura, Osaka (JP)

(73) Assignee: Panasonic Corporation, Osaka (JP)

(*) Notice: Subject to any disclaimer, the term of this patent is extended or adjusted under 35 U.S.C. 154(b) by 1203 days.

(21) Appl. No.: 12/063,884

(22) PCT Filed: Aug. 11, 2006

(86) PCT No.: PCT/JP2006/315957
§ 371 (c)(1), (2), (4) Date: Feb. 15, 2008

(87) PCT Pub. No.: WO2007/020897
PCT Pub. Date: Feb. 22, 2007

(65) Prior Publication Data
US 2009/0257649 A1 Oct. 15, 2009

(30) Foreign Application Priority Data
Aug. 17, 2005 (JP) .................................. 2005-236355

(51) Int. Cl.
*G06K 9/00* (2006.01)
(52) U.S. Cl. ......... 382/165; 382/170; 382/190; 382/224
(58) Field of Classification Search .................. 382/165, 382/170, 190, 224, 239, 305; 282/225
See application file for complete search history.

(56) References Cited

U.S. PATENT DOCUMENTS

| | | | |
|---|---|---|---|
| 5,537,488 A * | 7/1996 | Menon et al. | 382/170 |
| 6,549,660 B1 * | 4/2003 | Lipson et al. | 382/224 |
| 6,574,378 B1 * | 6/2003 | Lim | 382/305 |
| 6,744,922 B1 | 6/2004 | Walker | |
| 6,807,306 B1 | 10/2004 | Girgensohn et al. | |
| 7,016,540 B1 * | 3/2006 | Gong et al. | 382/225 |
| 7,035,467 B2 * | 4/2006 | Nicponski | 382/224 |
| 7,152,209 B2 * | 12/2006 | Jojic et al. | 715/720 |
| 7,630,562 B2 * | 12/2009 | Gong et al. | 382/219 |
| 2002/0146168 A1 | 10/2002 | Lee et al. | |
| 2003/0034996 A1 | 2/2003 | Li et al. | |
| 2003/0044062 A1 * | 3/2003 | Ganapathy et al. | 382/165 |

(Continued)

FOREIGN PATENT DOCUMENTS

JP 2000-285243 10/2000

(Continued)

OTHER PUBLICATIONS

International Search Report issued Nov. 21, 2006 in the International (PCT) Application of which the present application is the U.S. National Stage.

(Continued)

*Primary Examiner* — Vu Le
*Assistant Examiner* — Aklilu Woldemariam
(74) *Attorney, Agent, or Firm* — Wenderoth Lind & Ponack, L.L.P.

(57) ABSTRACT

A picture classifying unit in a video scene classifying device classifies obtained plural pictures into plural clusters based on a classification index which indicates a feature of the pictures. A cluster selecting unit selects at least one cluster among the classified clusters. An index generating unit assigns the index to at least one picture among the pictures which constitute the selected cluster.

11 Claims, 14 Drawing Sheets

U.S. PATENT DOCUMENTS

| | | | |
|---|---|---|---|
| 2004/0096110 A1* | 5/2004 | Yogeshwar et al. | 382/239 |
| 2005/0008263 A1 | 1/2005 | Nagahashi et al. | |
| 2008/0292196 A1* | 11/2008 | Jain et al. | 382/225 |
| 2009/0257649 A1* | 10/2009 | Yamauchi et al. | 382/165 |

FOREIGN PATENT DOCUMENTS

| | | |
|---|---|---|
| JP | 2001-022792 | 1/2001 |
| JP | 2001-167110 | 6/2001 |
| JP | 2002-041541 | 2/2002 |
| JP | 2003-032583 | 1/2003 |
| JP | 2003-052003 | 2/2003 |
| JP | 2004-280669 | 10/2004 |
| JP | 2004-361987 | 12/2004 |

OTHER PUBLICATIONS

Ichiro Ide et al., "A method for automatic indexing to a video based on shot classification" (An Automatic Video Indexing Method Based on Shot Classification), Shin-gaku ron (D-II), Oct. 1999, vol. J82-D-II, No. 10, pp. 1543-1551 (with English translation).

Hitoshi Aoki, "A high speed analysis system for a TV program corner configuration by image dialogue detection" (High-Speed Topic Organizer of TV shows Using Video Dialog Detection), Shingakuron (D-II), Jan. 2005, vol. J88-D-II, No. 1, pp. 17-27 (with English translation).

Masayuki Ryou-Ki et al., "Division of a sport video scene on play-by-play basis, using regularity of a cut structure" (Division of Sports Video into Play Units Using Regularity of Cut Composition), Shin-gaku ron, (D-II), Jun. 2002, vol. J85-D-II, No. 6, pp. 1016-1024 (with English translation).

"Clustering of Video Scenes Based on Spatio-Temporal Images with Fixed Length," The Institute of Electronics, Information and Communication Engineers, Journal, D-II, Jun. 2003, vol. J86-D-II, No. 6, pp. 877-885 (with English translation).

B. Li et al., "Event Detection and Summarization in Sports Video", IEEE Workshop on CBAIVL 2001, Dec. 2001, pp. 132-138.

* cited by examiner (a) 
1201

(b) 
1202

(c) 
1203

(a)

(b)

(c)

VIDEO SCENE CLASSIFICATION DEVICE AND VIDEO SCENE CLASSIFICATION METHOD

BACKGROUND OF THE INVENTION

1. Technical Field

The present invention relates to automatic index generating techniques for video contents, and particularly to a chaptering technique for automatically assigning a chapter (an index) to a broadcast video content.

2. Background Art

In recent years, due to rapid improvement in environments for photographing and storing digital contents, the issue of how to manage the contents has increasingly been under review. Widespread use of HDD/DVD recorders and other digital consumer electronics facilitates having and accessing a large number of video contents on an individual basis.

Under the above situation which may be referred to as "an explosive expansion of contents," how the convenience of viewing (furthermore, searching and editing) video contents should be provided is an challenge. For example, regarding a broadcast content such as a TV program, an audio visual supporting technique is essential; such a technique includes automatically assigning a chapter (an index) by a relevant unit, and cueing a desired scene with the press of a button, using the chapter.

Furthermore, there is another technique for chaptering a time stamp as metadata by detecting cut points in a program. As mentioned in the Japan Patent Office Technology Database, this is a conventional method (See Non-patent reference 1, for example). However, for a broadcast content in general, a cut point appears every several seconds to more than a dozen seconds. In the case of a commercial broadcast and a video clip such as for music promotion, a cut point can normally be found once less than a second. This implies that one program includes several hundreds to several thousands of chapters. Considering for convenience, it is impractical to operate several hundreds times or more to find a desired scene, and it should be stressed that using the cut points as they are meaningless.

In response, an attempt has been made to reduce the number of the chapters by putting several cut points together. Furthermore, several approaches have been suggested such as: an approach for chaptering by combining a video with linguistic information and an audio signal (See Non-patent reference 1 or Patent reference 1); an approach for using similarity to images between cut points (See Non-patent reference 2 for example); an approach for using regularity of a cut structure in a video and a structural feature of a video content, utilizing recognition extraction processing on a specific scene such as template matching and a model such as the Hidden Markov Model (See Non-patent reference 3 or Patent reference 2 for example); and an approach for simply packetizing at regular time intervals instead of the cut points (See Non-patent reference 4, for example). For convenience, all of the above are referred to as a category modeling method (CM method).

Patent reference 1: Japanese Patent Application Publication No. 2000-285243
Patent reference 2: Japanese Patent Application Publication No. 2003-52003.
Patent reference 3: Japanese Patent Application Publication No. 2004-361987.
Non-patent reference 1: "*Shotto Bun-rui ni Motozuku Eizo eno Jidouteki Sakuinn-zuke Ho* (A method for automatic indexing to a video based on shot classification)," by IDE, Ichiro et. al., *Shin-gaku ron* (D-II), Vol. J82-D-II, No. 10, pp. 1543-1551, October, 1999.
Non-patent reference 2: "*Eizo taiwa ken-syutsu niyorru terebi ban-gumi ko-na kousei kousoku kaiseki shisutemu* (A high speed analysis system for a TV program corner configuration by image dialogue detection)" by AOKI, Hitoshi, *Shingakuron* (D-II), Vol. J88-D-II, No. 1, pp. 17-27, Jan., 2005.
Non-patent reference 3: "*Katto kousei no kisokusei wo riyoushita supo-tsu eizou no purei tanni eno bunnkatsu* (Division of a sport video scene on play-by-play basis, using regularity of a cut structure)" by RYOU-KI, Masayuki et. al., *Shin-gaku ron*, (D-II), Vol. J85-D-II, No. 6, pp. 1016-1024, June 2002.
Non-patent reference 4: "*Kotei-cho no jikuukann eizo ni motozuku eizou shi-in no kurasutaringu* (Clustering of Video Scenes Based on Spatio-Temporal Images with Fixed Length)" by OKAMOTO, Yoshitsugu et. al., *Shin-gaku ron*, Vol. J86-D-II, No. 6, pp. 877-885, June 2003.
Non-patent reference 5: "Event Detection and Summarization in Sports Video" by B. Li et. al., IEEE Workshop on CBAIVL 2001, pp. 132-138, December 2001.

Meanwhile, a technique for adding metadata in one way or the other is necessary in order to implement an ideal audio visual assisting technique. However, it is generally considered that a sophisticated media recognition technique is necessary for adding the metadata, which is an obstacle to the practical application.

Thus, constitution of a system to which general-purpose metadata can be added needs constitution of large amount of knowledge base and understanding rule; therefore, automatic process for providing metadata has been considered unsuitable except for some professional-use systems, such as an asset management system which a manual approach is accepted (a labor-intensive metadata addition is required).

In other words, a conventional top-down approach which "individually specifies an object" is short of robustness, and thus has a serious problem under a general condition which a subject is difficult to be specified (Here, the top-down approach means a type of a method which: includes a process limiting objects, such as template matching and pre-learning; and cannot extract the objects without pre-recognizing the objects).

The top-down approach significantly depends on a performance which detects a subject to be detected in the system, and has a problem of discrepancy between an ideal model and actual data, so that the approach adds the meta data by: specifying beforehand the subject to be detected in a subject as a face, person, car, or building, and change of scene feature quantity; detecting the subject to be detected; and applying the subject to be detected to a model, thus, the robustness is susceptible to be lost.

Furthermore, practical problems in the conventional art are considered.

First, assigning standard of a chapter should be clear to a user. For example, when using "skip viewing" jumping to the next chapter while viewing, the user cannot actually use the "skip viewing" unless the user can image beforehand "what kind of scene is coming after the skipping." For the user, the situation in which "the user is not sure a next scene to which a jump is made" is no difference with the situation skipping, using random numbers, and the user eventually loses his/her interest in viewing.

In other words, in the case where a position of the "chapter" is unclear to the user, it is "uncertain which scene has been skipped" among scenes to be viewed, resulting in "difficult to use (because the user may miss an important scene)." In the case where it is unpredictable "which scene is skipped and which scene is following," the chapter is not considered to be clear.

As mentioned above, in order to support a user in the case of viewing, searching, and editing, it is an absolute requirement that a chapter should be assigned to a clear position to the user. Preferably, the position of the chapter is reasonable and is on a scene with fixed meaning. In order not to miss an important scene, a recall rate, in particular, should be emphasized.

Here, the scene which is reasonable and has the fixed meaning: means a scene, such as an appearance scene of each group in a variety show and each pitching scene in a baseball broadcast, the scene which is implied by the user as the "next scene,"; and, furthermore, has relatively high frequency of appearance.

From the above point of view, any of conventional art which has been disclosed is not sufficient.

For example, on a chapter, there is a case in that when the chapter is not necessarily wrong as a cut point with meaning, the chapter is considered to be a correct answer. In this case, since granularity of each chapter in a program changes, that is, one chapter is assigned to a ten-minute group (scene) with meaning, and another chapter is assigned to a scene for approximately three seconds, the user gets very confused, not knowing whether a scene for ten minutes is skipped or a scene for a few seconds is skipped.

Furthermore, when limited to a specific program content, such as baseball and soccer, there is no versatility without question. In conventional techniques, even the baseball broadcast alone, it is impossible to respond to change of weather and a ball park.

There is also a case where: a video scene is divided into several small intervals at switching points of shots and any given changing points of a video scene; each interval is classified, using any given method; and generate a chapter by extracting structural elements of the video scene, checking mutual relationships between the respective classified chapters (See, for example, Patent reference 1).

In this case, however, extraction performance of the structural elements is influenced by classification performance. A regular broadcast video is not always stable in shooting condition, and various changes occur, such as change of whether, and insertion of tickers and captions. Thus, classification performance in accordance with a regular video at a present technical level is very low and unstable.

Because of the unstable classification performance, in the conventional method, finished clusters as a result of classification have been subject to a comparison one by one (comparing similarity by means of mutual correlation), and a search (or estimation) whether or not a similar scene is included in the cluster.

In the above mentioned Patent reference 1, the one by one search is referred to as chain detection, and used for extracting a program structure in a video. However, Patent reference 1 does not mention how two clusters which have not originally judged as the same clusters (thus, not classified into the same cluster) can be chained as the same clusters.

Therefore, implementation with practical accuracy is considered impossible. Thus, even though a similarity judgment engine is implemented for chaining, clusters should be searched one by one, and structural elements should be extracted; therefore, the calculation cost becomes enormous. Furthermore, whether finished chapters are clear or not still remains to be another problem.

In general, chapter performance for the CM method is represented in a recall rate (Recall) and precision rate (Precision) in reference to an assumed model.

As disclosed in the above Patent reference 2 and Non-patent reference 5, for example, in the case where: a condition is significantly limited (in this case, limited to a baseball broadcast); a type of a picture to be classified is rigidly determined beforehand (in this case, fixed as a pitching scene); and feature quantity for classification is designated for the pitching scene, (in this example, the feature quantity is set by hard cording as "a green area and a brown area should appear in a pitching scene" as in the after-mentioned Step S304 and Step S305 of FIG. 2), it is reported that the recall rate is 98% and the precision rate is 95%.

The performance represented as these values may look sufficient. However, it should be noted that the condition for the figures is specialized in a baseball game which is easy to structuralize and relatively static in picture pattern.

Moreover, in this example, chapters are assigned to each pitching scene through a baseball broadcast. Approximately, 200 to 300 pitching scenes occur a game. In the case of 250 pitching scenes, for example, probability of successful chaptering, in a game, which does not miss each pitching scene is probability which equals to 98% to the 250th power by simple arithmetic 0.98 to the 250th power is 0.0064. In other words, approximately 0%.

By summarizing the above, the conventional video processing systems are based on classification performance of pictures. However, due to (time) change and fluctuation of moving picture data, a good classification result is not always available. Until now, the classification has been performed by dividing a moving picture into segments which includes plural frames, and using feature quantity of each of the segments (such as color histogram of the whole picture and variation in a time direction). However, during a broadcast, a ticker is inserted and cameras are switched from one to another at any given timing, and there often occurs a case that segments which are desired to be classified in the same category when a person is watching are categorized in different categories. Such a change of situation cannot be followed by the top-down approach, in particular.

The above-mentioned video processing using an unstable classification method is low in performance as a result, and has little practical use, the processing having low noise immunity and limited service condition. Furthermore, a latter part (a chapter position determining routine) tries to compensate the low classification performance, thus the approach is very slow in speed since a video structure is estimated, searching all the classified similarities among each category. As a result, in order to circumvent the low classification performance, there has been no choice but to take a specialized approach in a content of broadcast contents, and versatility has suffered.

Moreover, it is reiterated that assigning standard of a chapter to be generated should be clear and the scene is required to be reasonable and have fixed meaning.

The present invention is presented in view of the above problems, and has an object of providing a versatile and fast video scene classification device which can generate a clear chapter for a user.

SUMMARY OF THE INVENTION

In order to solve the above problems, a video scene classification device in the present invention is the video scene classification device which assigns an index to one or more pictures among pictures which compose a video, and includes: a picture classifying unit which classifies the pictures into clusters based on a classification indicator which indicates a feature of the pictures; a cluster selecting unit which selects at least one cluster among the classified clusters; and an index generating unit which assigns the index to at least one picture among the pictures which constitute the selected cluster.

In this structure, by performing clustering, based on the classification indicator, on the pictures which compose the video, specification of a cluster to which the index should be assigned, as well as classification having high robustness are possible. Thus, chaptering which is clearer to a user is possible.

Furthermore, the video scene classification device further includes a video sampling unit which obtains the pictures from the video by performing sampling, and a processing area determining unit which determines a processing area on which image processing is performed on the obtained picture basis, and specifies the classification indicator by performing the image processing on the processing area. The picture classifying unit performs the classification based on the classification indicator in the determined processing area.

In this structure, the classification indicator is determined by dynamically limiting a more reasonable area in each picture and providing the image processing. Thus, even though there is a case where fluctuation occurs in the image, such as a caption inserted within the image, stable clustering based on the classification indicator is possible.

In addition, the video scene classification device further includes an indexing rule selecting unit which selects an indexing rule based on one of the classification indicator for the classified clusters and program content information of the video. The index generating unit assigns the index to the picture in the selected cluster, using the selected indexing rule.

In this structure, the rule to assign the index to the selected cluster can be selected based on one of the classification indicator and the program content information, and thus, an index which associates more with the feature of the picture can be assigned.

Moreover, the indexing rule selecting unit selects an indexing rule from among one of rules which requires to: (1) assign the index to all pictures included in the selected clusters; (2) sort all the pictures included in the selected clusters according to a time axis, and assign the index to every picture group within a predetermined time period; and (3) assign the index to a video block, among video blocks included in a predetermined cluster, which has not been included in a continuous group due to another predetermined cluster.

In this structure, a more detailed index assignment rule can be defined, so that the chaptering which is clearer to the user is possible.

Note that the present invention can be implemented as: a video scene classification method utilizing characteristic structural units in the above video scene classification device as steps; and a program causing a computer to execute those steps. As a matter of course, the program can be widely distributed via a transmission medium such as a recording medium, like a DVD, and the Internet. Moreover, the present invention can also be implemented as an integrated circuit which includes the above-mentioned characteristic structural units.

Furthermore, the present invention can also be implemented as a client and server system including the characteristic structural units of the above video scene classification device 100.

With the present invention, versatile and robust chaptering which is easier for a user to understand is possible, and a clear and reasonable chapter to the user can be generated.

At the same time, since a generated cluster has high accuracy, classification procedure between clusters and similarity inspection among generated cluster, as performed in a conventional approach, are not necessary. Thus, high-speed processing is possible.

NUMERICAL REFERENCES

Figure 1:
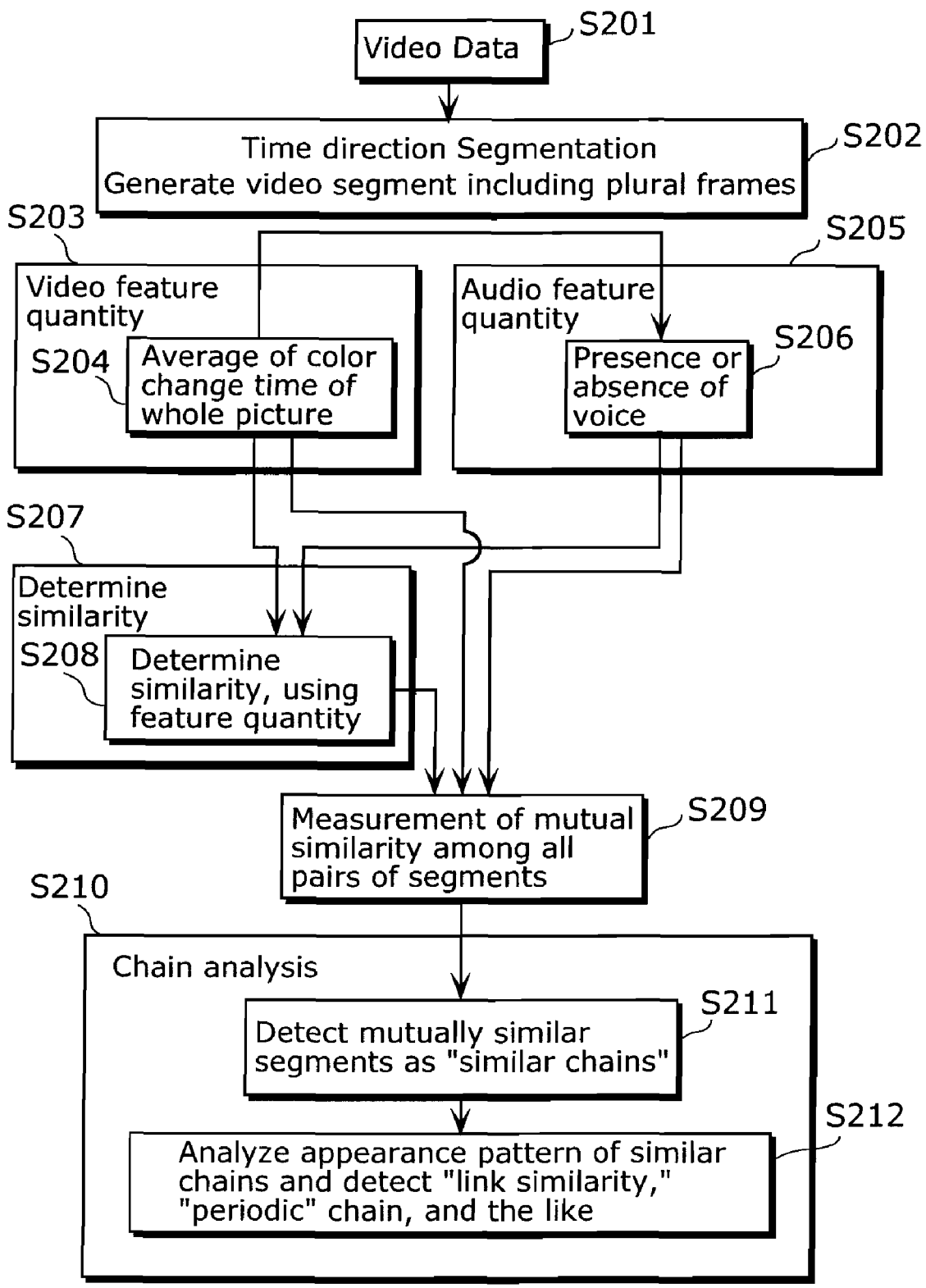
FIG. 1 is a diagram showing an outline of Conventional example 1.

100 Video scene classification device
101 Video inputting unit
102 Video sampling unit
103 Processing area determining unit
104 Picture classifying unit
106 Cluster selecting unit
107 Indexing rule selecting unit
108 Index generating unit
109 Index reproducing unit
110 Outputting unit
120 Program information
1201 Cut picture
1202 Cut picture
1203 Cut picture
1301 Processing area setting example
1302 Processing area setting example
1303 Processing area setting example

DETAILED DESCRIPTION OF THE INVENTION

An embodiment of the present invention will be described as follows, with reference to the drawings. Note that the present invention is described, using the embodiments and attached drawings; however, an objective of these is exemplification, thus the present invention is not limited to these.

Furthermore, the present invention relates to a video scene classification chaptering technique which: classifies video data (moving picture data or still picture data such as a broadcast content and a personal content) more effectively and efficiently; and generates a chapter more accurately and faster. This video scene classification chaptering technique acquires a higher performance in the case where previous knowledge regarding the video data is provided. As an example of the previous knowledge: program information (EPG information) 120 for the broadcast content; and information such as "travel," and "track meet" by user input, and position information and indoor/outdoor information on the GPS is pointed out.

Embodiment

Figure 4:
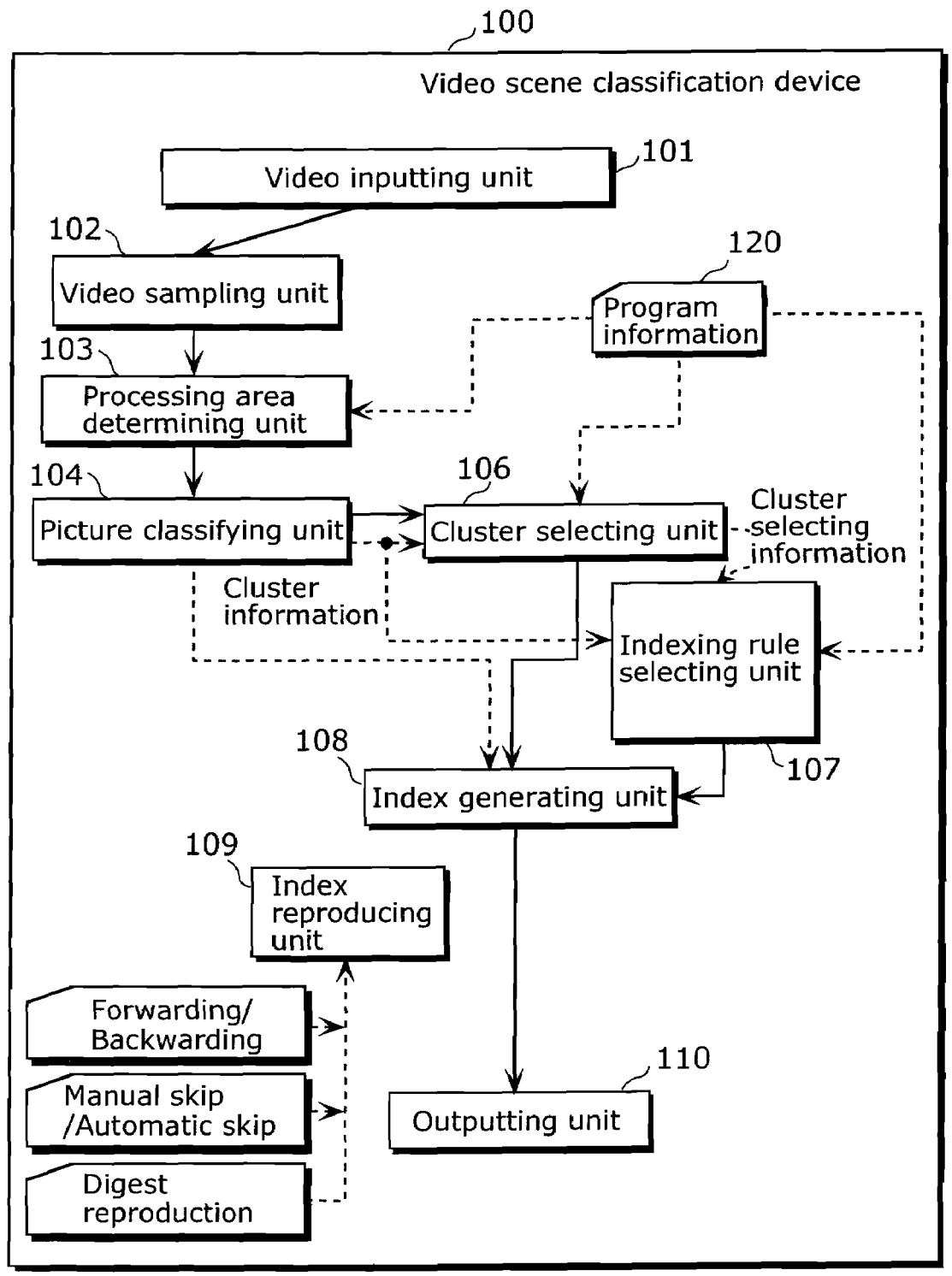
FIG. 4 is a block diagram showing a functional structure of a video scene classification device according to a first embodiment.

FIG. 4 is a block diagram showing a functional structure of a video scene classification device 100 according to the present embodiment. First, an outline of functions referring to the video scene classification device 100 shall be described, and then, functions of each unit shall be described in detail.

First, video information (information regarding controlling and managing of video data which represents the video itself and the video) is inputted into a video inputting unit 101. The inputted video information is sampled in a video sampling unit 102 is based on a predetermined time interval (and/or a predetermined rule), following which a group of still pictures is formed. Note that by using a cut detecting function (in other words, a function for detecting a cut point which indicate switching between video shooting cameras), the sampling of the video may be performed at a cut point, (in the description hereinafter, an output from the video sampling unit 102 is referred to as a "cut picture" for convenience. As a matter of course, the video may be sampled by any given sampling method).

A picture classifying unit 104 is a part for generating one or plural clusters by classifying (hereinafter referred to as "clustering") the cut pictures. Note that a picture group, which includes one or plural still pictures, obtained by clustering the above cut pictures is referred to as a "cluster." The fact that classification performance of the picture classifying unit 104 significantly affects the whole performance of the video scene classification device 100 has already been mentioned as a problem in the conventional art. An indicator in classifying the cut pictures (hereinafter referred to as "classification indicator") is calculated out of picture information on each cut picture (for example information showing a picture data indicating the whole cut picture and a feature of the cut picture). In order to follow adaptively a change within the cut picture and allow stable classification, therefore, a processing area determining unit is provided before the picture classifying unit.

The processing area determining unit 103 is a part for dynamically changing to set an area, not the whole picture, having suitable information within each cut picture for classification in the case where the classification indicator (namely, physical quantity used for clustering) is calculated from the picture information in each cut picture. In addition, a user can change the classification indicator, using an operation inputting unit (not shown).

Next, functions of the processing area determining unit 103 are briefly described. For example, a case when an index (chapter) is assigned to a pitching scene in a baseball broadcast is considered. A person can recognize the pitching scene as a pitching scene; however, there are a lot of variations in actual pitching scenes (See FIG. 12).

For example, suppose a cut picture 1201 is a basic pitching scene. A cut picture 1202 is a pitching scene with a caption showing scores and counts, and moreover, an angle of the camera is slightly changed (In the cut picture 1202, a wall below the net can be seen). Furthermore, a cut picture 1203 is a pitching scene with a caption on the batter assigned.

Figure 13:
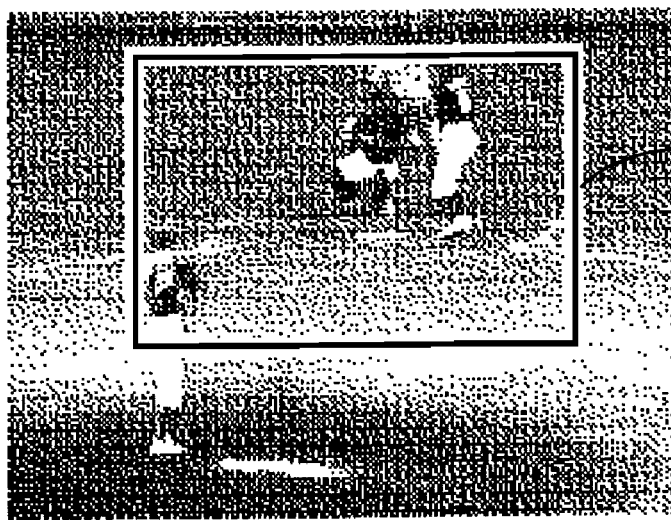
FIG. 13(a) through (c) is a drawing showing determination samples of a processing area.
Figure 13:
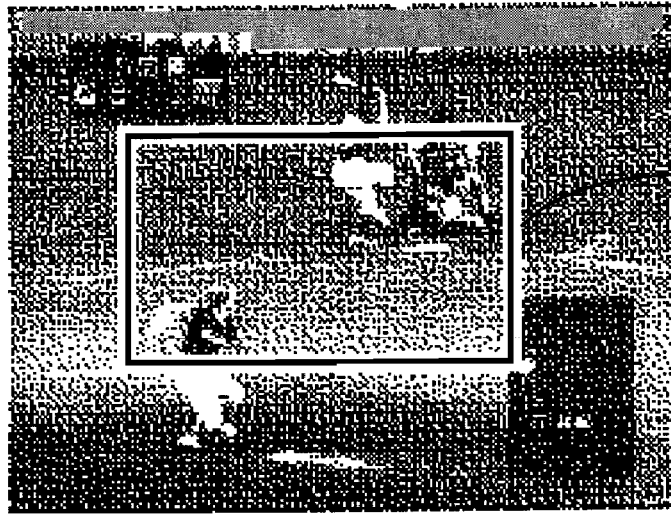
Figure 13:
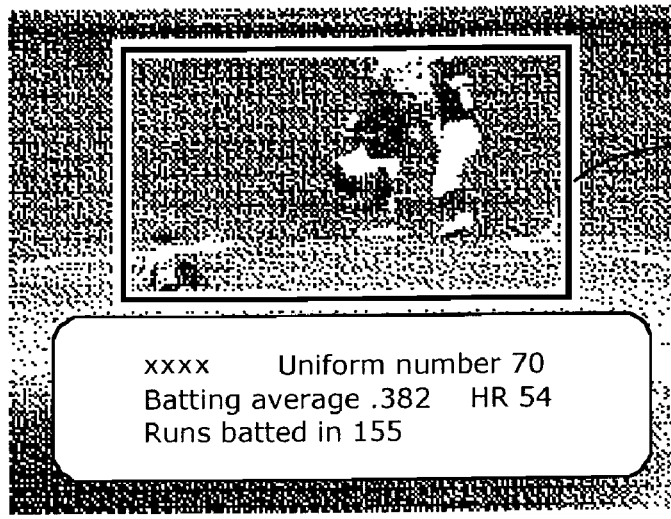

To these plural cut pictures, the processing area determining unit 103 dynamically sets an area to be anticipated (for example, in the case of the baseball, an area showing a play between a pitcher and a batter) on a cut picture-to-cut picture basis, the area which draws the person's interest when grasping a content of a program (See FIG. 13). A processing area setting example 1301, a processing area setting example 1302, and a processing area setting example 1303 shown in FIG. 13 respectively correspond to processing area setting examples of the cut picture 1201, the cut picture 1202 and the cut picture.

As mentioned above, in the present embodiment, since the picture information on the processing area set by the processing area determining unit 103 is used, not using information on the whole picture as conventionally used, robust classification (clustering) can be performed by the picture classifying unit 104, adapting a change of an object to be classified (Principle of operations and internal operations of the processing area determining unit 103 are described hereinafter).

Next, functions of cluster selecting unit 106 are described. The cluster selecting unit 106 selects a cluster to be used, among the clusters classified in the picture classifying unit 104, for assigning the chapter by following a predetermined rule. Needless to say, an element of each cluster is the cut picture, and each cluster is formed by compilation of one or more cut pictures.

As one example of a rule when a cluster is selected in the cluster selecting unit 106, a case where "a cluster having the largest numbers of elements" is described.

Regarding the clusters classified in the picture classifying unit 104, the cluster selecting unit 106 is considered to sort the clusters in the order of having the largest number of elements (the number of cut pictures). In this case, the cluster having the largest number of elements includes similar cut pictures which are broadcasted most frequently; therefore, the fact that the cut pictures have been broadcasted most frequently is said that the cut pictures are the program's main component part which a delivery side wants to send (has to send) most (Note that such a theory does not work out in the case of the conventional video classification method which cannot correctly classify).

Figure 12:
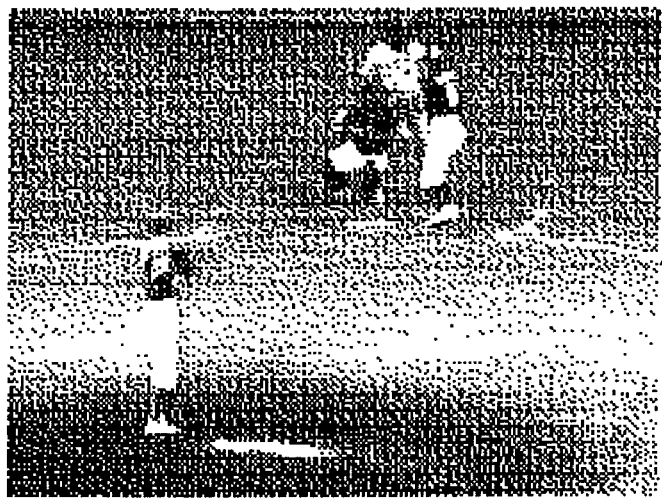
FIG. 12(a) through (c) is a drawing showing samples of cut pictures.
Figure 12:
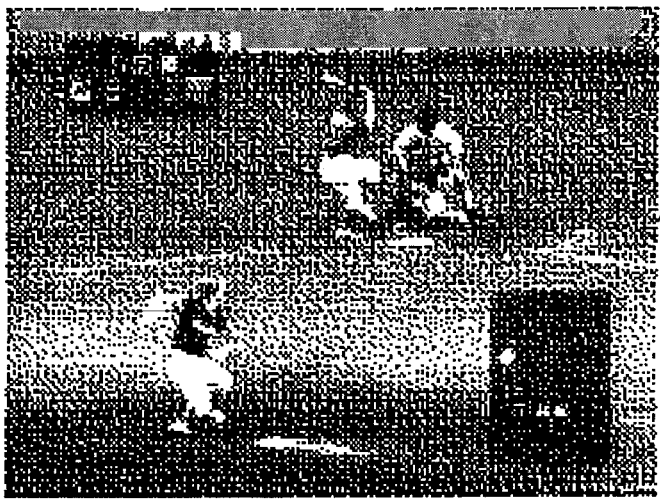
Figure 12:
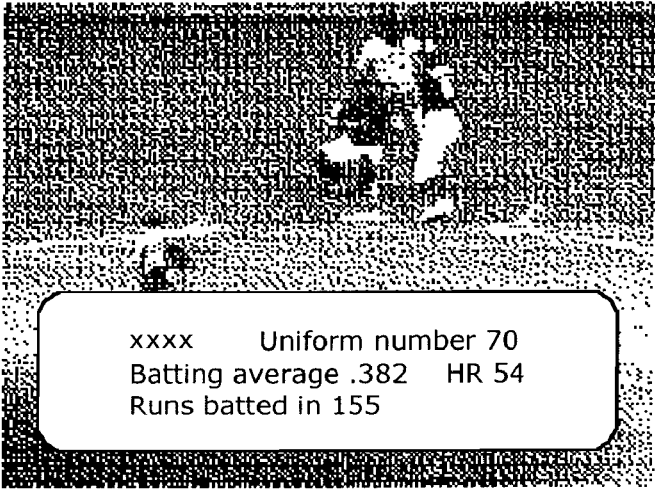

For example in the case of the baseball broadcast, cuts appearing most frequently during the broadcast are cut pictures of pitching scenes such as FIG. 12 (a) through (c) (According to an experiment, it is confirmed that appearance frequency of the cut pictures of the pitching scenes are significantly higher than that of other cut pictures). And, needless to say, the pitching scenes a trigger of the baseball play, and are the most important component parts.

In other words, in the case of the baseball broadcast, when clusters with the largest number of elements are selected, the cut pictures of the pitching scenes are compiled in the clusters.

In other kinds of programs, a case where the selection method of clusters should be changed is considered; however, a basic operation of the cluster selecting unit 106 is to select necessary (or important) clusters (details of the cluster selecting unit 106 is described hereinafter).

Next, functions of an indexing rule selecting unit 107 are described. The indexing rule selecting unit 107 determines an index generating rule (also referred to as a "chapter generating rule") which is for assigning an index (chapter) to the cut picture of the cluster selected in the said cluster selecting unit 106.

For example, an index generating rule in the case where "the cluster having the largest number of the elements" is selected in the cluster selecting unit 106, as aforementioned, is described. In this case, the index generating rule determined by the indexing rule selecting unit 107 is to "assign indexes to all the cut pictures selected in the cluster selecting unit 106." This corresponds to "direct generation" in Step S909 in a flowchart of the after-mentioned FIG. 9.

Other index generating rules are to be described hereinafter. A basic operation of the indexing rule selecting unit 107 is to determine a necessary rule when assigning a chapter as mentioned above (details of the indexing rule selecting unit 107 is described hereinafter).

Next, functions of an indexing generating unit 108 are described. The index generating unit 108 assigns the index to all the cut pictures or some of the cut pictures included in the which is cluster selected in the cluster selecting unit 106 (referred to as a "selected cluster," hereinafter), following the index generating rule which is selected in the indexing rule selecting unit 107.

Operations of the index generating unit 108 are described in detail, following the example of the indexing rule selecting unit 107 mentioned above. In the cluster selecting unit 106, "the cluster having the largest number of the elements" is selected, and in the indexing rule selecting unit 107, "the direct generation" rule is selected. Then, the index generating unit 108: reads out "the cluster having the largest number of the elements" out of cluster groups which are classified by the picture classifying unit 104; and assigns the index to all the cut pictures included in "the cluster having the largest number of the elements."

As mentioned above, the selected cluster which is selected in the cluster selecting unit 106 is read out from the cluster groups which are classified by the picture classifying unit 104. Then, following the rule which is selected in the indexing rule selecting unit 107, the index is assigned to some or all of the cut pictures in the selected cluster.

Next, functions of an indexing reproducing unit 109 are described. The index reproducing unit 109 performs reproduction of the video, using the index (chapter) generated in the index generating unit 108. The index reproducing unit 109 performs: moving to a cut picture to which the next chapter is assigned; moving to a cut picture to which the previous chapter is assigned; a manual skip and an automatic skip to the cut picture to which a chapter is assigned on the cut picture-to-cut picture basis; and moving to a cut picture to which the next chapter is assigned, after reproducing, for designated seconds, a cut picture and the subsequent cut pictures to which the respective chapters are assigned.

Next, functions of an outputting unit 110 are described. The outputting unit 110 outputs index information which shows the generated index. The outputting unit 110 may output the index information by itself, by associating with the inputted video, or as a video with the chapter assigned by setting the chapter to the inputted video.

Finally, program information 120 is described. The program information 120 represents program-related information which is available via the Internet, a broadcast, an airwave or input by the user, including the EPG information. The processing area determining unit 103, the cluster selecting unit 106, and the indexing rule selecting unit 107 can utilize this program information 120 as auxiliary information.

The above is the outline of the operations on the video scene classification device 100.

Note that an object of the block diagram in FIG. 4 is exemplification; however, the present invention does not necessarily include the component parts included in FIG. 4, and a minimum configuration which meets necessary functions may be selected for its implementation.

Note that a sampling interval in the video sampling unit 102 may be: at fixed duration (one second, for example); sampling at an I-frame of an MPEG stream; sampling at a cut point; and sampling, using any given predetermined method.

Moreover, instead of outputting a cut picture which is a still picture, the inputted video may be divided into any given length of small video streams in the video sampling unit 102, and outputted as video stream groups. In this case, a series of post-processing on the sampled still picture can also be understood as processing to some or all of the frames in the small video stream.

Note that in the case where reception of instruction input from the user or a host system is necessary, the reception may be performed via the video inputting unit 101.

Operations of each of main parts of the video scene classification device 100 in the present invention shall be described in detail hereinafter.

Figure 5:
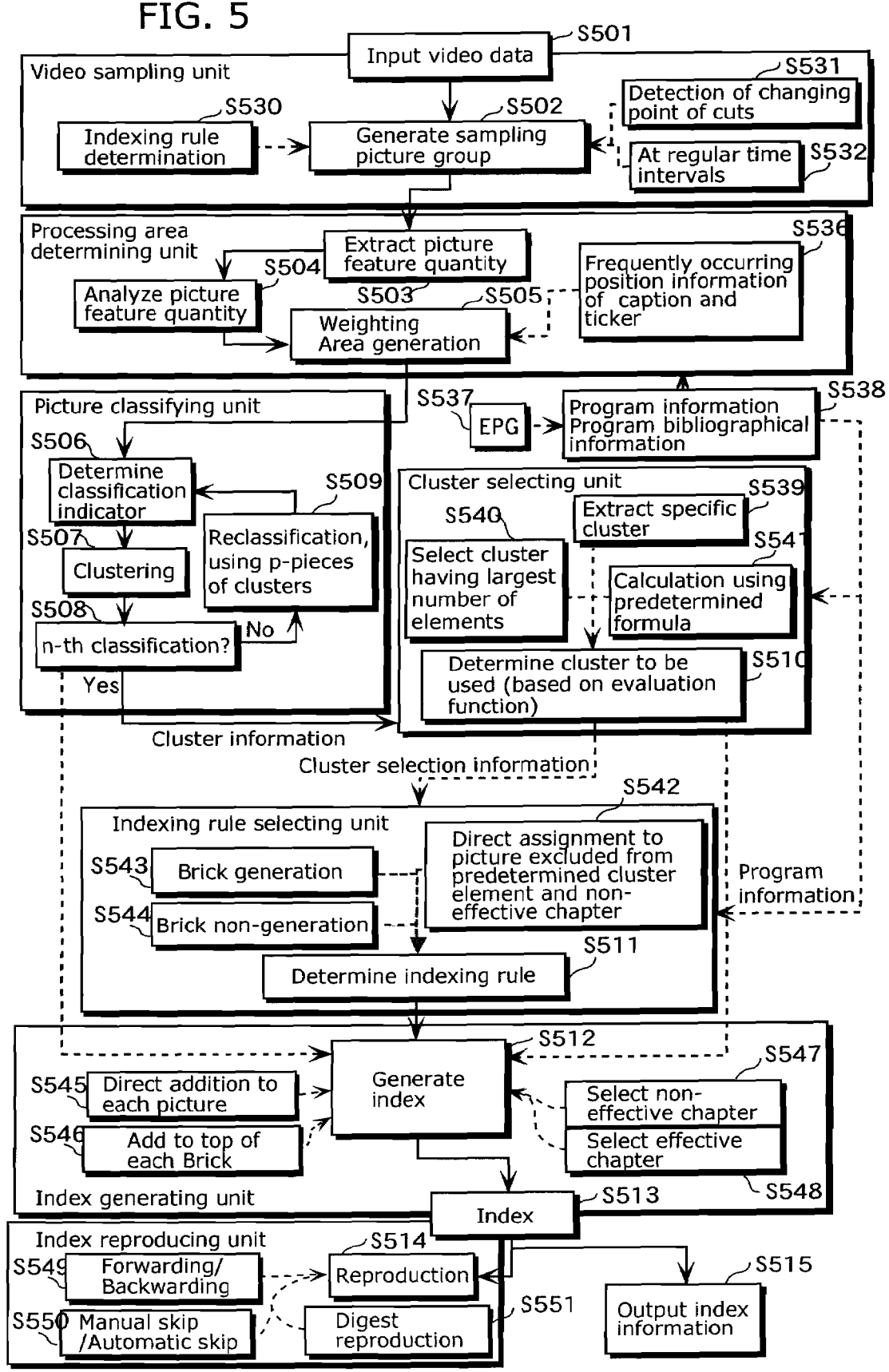
FIG. 5 is a block diagram showing, in detail, the functional structure of the video scene classification device according to the first embodiment.

FIG. 5 is a more detailed functional block diagram of the video scene classification device 100. Then, FIG. 6 through FIG. 10 are flowcharts showing conditions of internal operations in each unit.

As shown in FIG. 5, first, when the video data is inputted into the video inputting unit 101 (S501), a cut picture group which is sampled in the video sampling unit 102 is generated (S502). Regarding a method for generating the cut picture group, any given conventional method can be used, such as generation by sampling at a changing point of the video content (S530), generation by detecting the changing point of the cut to perform sampling at the changing point (S531), and generation by sampling at regular time intervals (S532).

Figure 10:
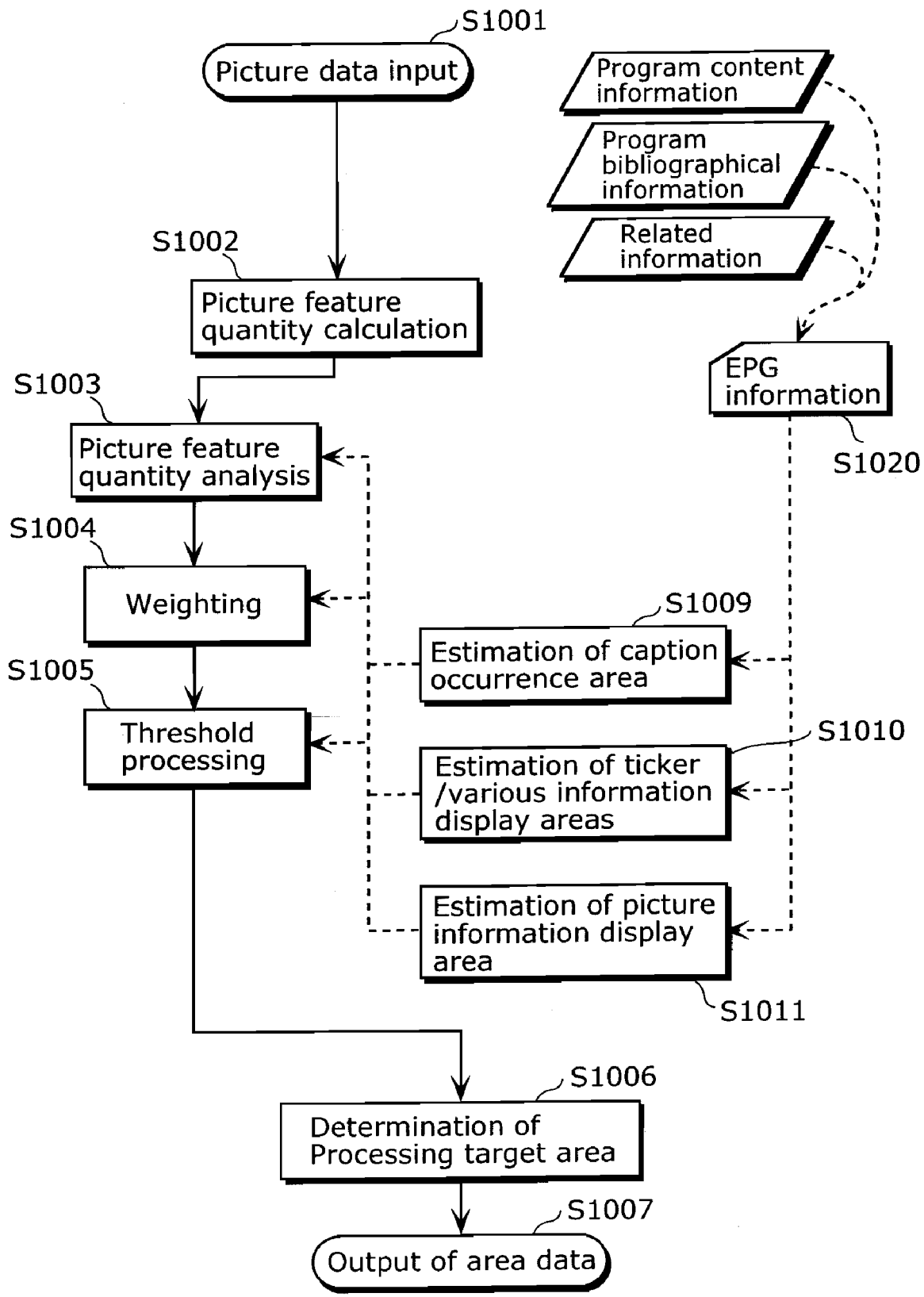
FIG. 10 is a flowchart showing conditions of internal operations of a processing area determining unit.

Next, operations of the processing area determining unit 103 are described in detail (See FIG. 5 and FIG. 10).

When the picture data of the sampled cut picture group is inputted (S1001), the processing area determining unit 103 calculates picture feature quantity out of each cut picture (S503/S1002). The picture feature quantity used here is physical information relating to the picture, and includes luminance information (edge, the Mach effect amount), and color information (hue and color difference). Based on the extracted picture feature quantity, the processing area determining unit 103 performs analysis of the picture feature quantity on the pixel-to-pixel basis or the small block-to-small block basis (S504/S1003). A predetermined weight value is assigned to the analyzed each picture feature quantity, each of weighted picture feature quantity is combined (S505/S1004), and threshold processing is performed (S1005).

Furthermore, to cut pixel groups which correspond to the picture feature quantity specified by the threshold value processing, the processing area determining unit 103 determines a rectangle in the cut picture, the rectangle which includes or circumscribes to the cut picture groups (S1006). The processing area determining unit 103 outputs the rectangle determined above as a processing area (S505/S1007).

Here, the analysis and weighting of the picture feature quantity, and processing of the threshold value may be adaptively changed, using program content information, program bibliographical information, or related information.

For example, by obtaining the program content information via the EPG information (S1020): an area in which a caption can be generated and generation frequency of the caption are estimated (S1009); an area in which a ticker/various kinds of information can be generated and generation frequency of the ticker/information are estimated (S1010); and an area showing main picture information, not auxiliary information such as the caption and the ticker, is also estimated (S1011). Then, in the case where the picture feature quantity is analyzed, by preferentially using the picture feature quantity of the main picture area, and relatively lowering (or heightening) the weight value of the picture feature quantity generated from a caption area when weighing, influence on the main picture information can be relatively heightened (or lowered). In addition, regarding an area of the threshold value, changing quantity of the whole picture can be easily enlarged in the case where the ticker and the caption are likely to be generated, thus, processing by any given combination of estimation of the area and frequency with each processing can be performed, such as: heightening the threshold value; and, on the contrary, lowering the threshold value when the generation of the ticker or the caption is infrequent.

Note that a shape of the determined processing area is not limited to a rectangle. Note that instead of the rectangle which includes or circumscribes remaining points after the threshold value processing, the processing area may be determined with a predetermined (or larger than the predetermined size) size of area moved within the picture, the predetermined area which is determined without performing the threshold value processing, in order to increase the picture feature quantity per unit area. Note that when the content information of the program is obtained via the EPG information, a main color in the video may be estimated from the program content (green for a soccer broadcast, for example), so as to use a deviation level to the color as the picture feature quantity.

According to the result of the above, as mentioned in FIGS. 12 and 13, as the areas to be processed for each of the cut picture 1201, the cut picture 1202, and the cut picture 1203, the processing area setting example 1301, the processing area setting example 1302, and the processing area setting example 1303 are determined.

At the processing area determining unit 103, the processing area is approximately determined as follows. For example, in the case of the processing area setting example 1301, a difference in color or edge obviously appears on the left and right sides of the pitcher. The same applies to the white lines of the batter's box, the batter, the catcher, and the umpire. By weighing and adding these, a point (small block) having the picture feature quantity which is larger than the predetermined threshold value is generated.

Among the points (small blocks) larger than the predetermined threshold value, the leftmost point in the picture is the left edge on the pitcher, the rightmost point is the white lines of the batter's box, the top point is the batter's or the catcher's head, and the undermost point is the waistline of the uniform of the pitcher or the boundary line between green and brown on the playing field. Determination of these four sides creates an area such as the processing area setting example 1301. The same applies to the processing area setting example 1302, and the processing area setting example 1303. Other than edges on the uniform and the batter's box, the processing area is determined along edges on the caption (score display or count display), and the ticker (batter introduction).

Figure 6:
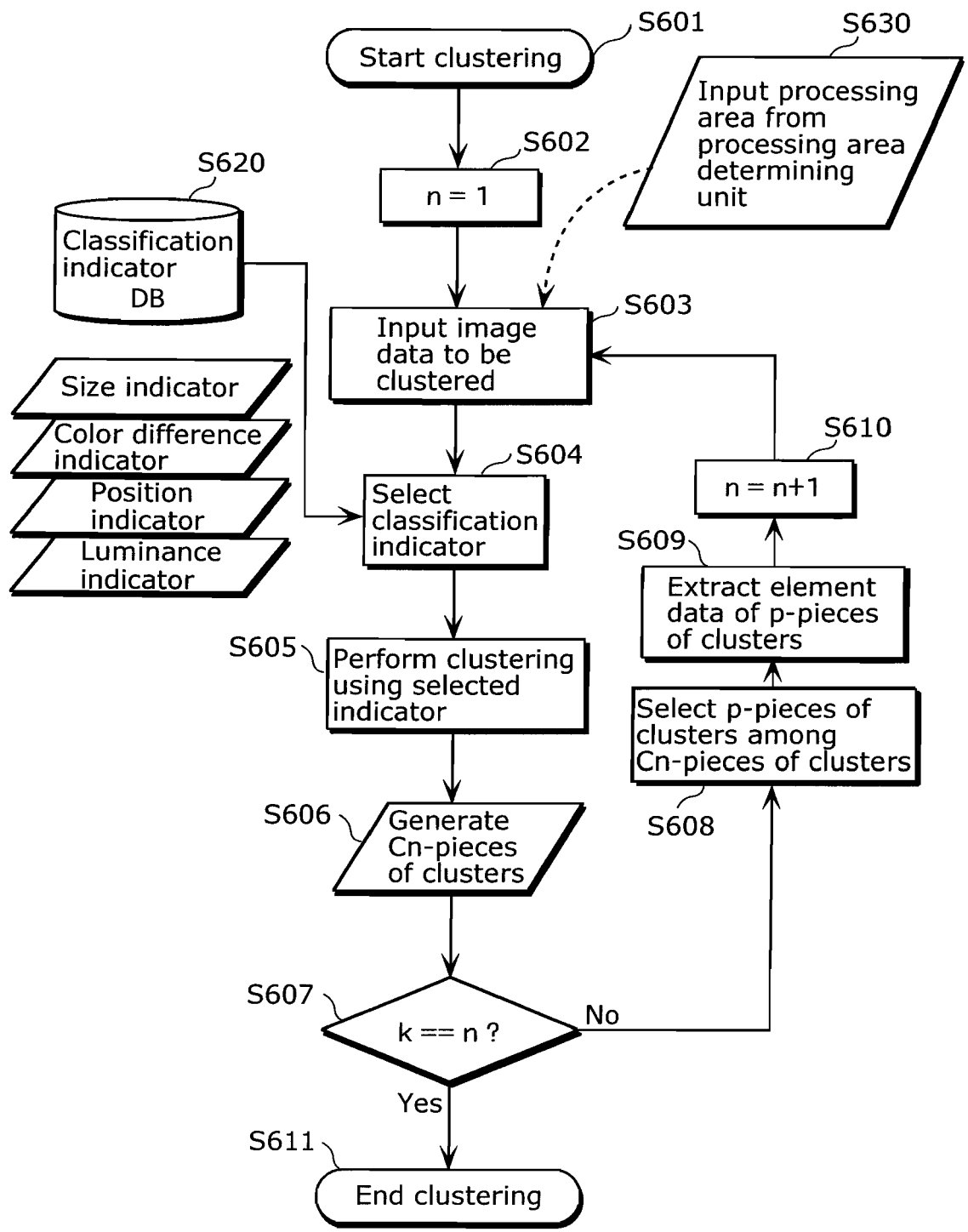
FIG. 6 is a flowchart showing conditions of internal operations of a picture classifying unit.

Next, the picture classifying unit 104 shall be described in detail (See FIG. 5 and FIG. 6).

FIG. 6 is a flowchart showing conditions of internal operations of the picture classifying unit 104.

When the picture classifying unit 104 is called (S601), a variable n is set to "1" (S602), and clustering is started upon an input of the cut picture (S603). Then, the classification indicator is selected (S604/S506), and clustering is performed using the selected classification indicator (S605/S507). A clustering algorithm may be utilized, using any given method.

Note that clustering methods can be broadly classified into: hierarchical clustering which amalgamates and compiles similar characteristics; and nonhierarchical clustering which divides a class in order for the similar characteristics to belong to the same group as a result. The "k-mean method" is a typical example of the nonhierarchical clustering. Moreover, in the case of the hierarchical clustering, first, each subject is considered as individual one piece of cluster. Then, by integrating near clusters one after another, the final classification result is obtained. The "shortest distance method" is a typical example of the hierarchical clustering.

Now, as a result of the clustering, Cn pieces of clusters are generated (S606). Here, n is 1 and thus, the number of clusters is C1. Here, invariables k and n are compared (S607). In the case where k is not equal to n, p pieces of clusters are selected among Cn pieces of clusters (S608/S509), 1 is assigned to n (S610), and the clustering is retried, using the cut picture group included in the p-pieces of clusters as a new inputted picture data (S603). In this case, p is a positive integer which is Cn or less. p is determined as the number of clusters, starting from a cluster having the highest number elements up to the cluster with which the number of elements of the clusters reaches a predetermined percentage of the total number of cut input pictures, where p does not exceed one-half of Cn.

Furthermore, when k equals to n in the step S607, the clustering is finished (S611).

Note that the method for deciding p is not limited to the above. p may be simply decided as a number to reach predetermined percentage of a total number of input cut pictures in the order of clusters having the largest number of elements. Moreover, p may be decided, using an invariable. Furthermore, p may be set as a predetermined rate for Cn.

Note that the invariable k may be a fixed value. However, instead of S607, whether or not the clustering is performed again may be determined by whether or not a predetermined rate or more of the cut pictures are classified in a specific cluster (a cluster ranked high in the number of elements.

Note that the processing area may be inputted from the processing area determining unit 103 (S630). When the processing area is inputted, as the classification indicator for clustering, information showing physical quantity which is limited by the processing area may be used. For example, a shape, position, and size of the processing area may be the classification indicators when clustering.

Note that when the classification indicator is selected, a classification indicator stored in the data base may be referred (S620). For example, other than the above classification indicators, such as a shape, position, and size of the processing area, a color indicator (a hue indicator and color difference indicator) and a luminance indicator may be selected as the physical quantity from the picture information for the classification indicator.

Note that the picture feature quantity such as the color difference indicator and the luminance indicator may be calculated, covering only the picture within the processing area. As a matter of course, this can be only the picture outside the processing area; moreover, only a peripheral area with predetermined width around the processing area may be covered.

Other than the physical quantity used directly as these classification indicators, a histogram may also be used. Furthermore, frequency conversion, such as the Discrete Cosine Transform (DCT) and the Fast Fourier Transform (FFT), may be performed to use the DC component or the AC component as an indicator.

Note that the following two kinds of physical quantity can be used as the classification indicator when clustering. "1. a position of the processing area in the cut picture," and "2. a range of picture feature in and out of the processing area (for example, 20 pixels around)."

In particular, regarding the physical quantity "2." mentioned above, edge strength and a hue histogram are respectively obtained among pixels which are in and out of a range from a boundary of the processing area. The classification of the cut pictures is performed, out of the two classification indicators "1" and "2", by clustering based on, for example, the shortest distance method. In this case, by using two classification indicators individually, the clustering may be performed in two stages.

First, the clustering is performed, using a distance between areas to be processed D1 as a distance scale. In the case where the areas to be processed are rectangles, D1 is a distance across corresponding vertexes between the two rectangles. By comparing the distance between the areas to be processed, an effect of specifying a rough composition of the cut picture is expected. Then, a certain number of clusters are selected in the order of the cluster having the largest number of elements in the first clustering. Corresponding to the cut picture which belongs to the clusters, a distance D2 is set based on a histogram, and the second clustering is performed.

D2 is defined, using an edge strength histogram He and a hue histogram Hh, as follows.

$$D2 = \sum_{i=0}^{Ne} [\text{MIN}\{He, x(i), He, y(i)\}] + \sum_{j=0}^{Nh} [\text{MIN}\{Hh, x(j), Hh, y(j)\}] \quad [\text{Expression 1}]$$

Note that MIN{x,y} represents the smaller value of x or y. Moreover, Ne and Nh represent orders of the histogram. For example, when Ne is 16 and Nh is 15, the hue histogram He includes twelve stages of chromatic colors and three stages of achromatic colors. Using the edge strength histogram He and the hue histogram Hh, an effect of specifying similarities between the foreground and the background of the cut picture is expected. With the both combined, a near feature, the part of which feature draws interest, is captured, as well as "where a person look at to judge the similarities" is roughly considered. Thus, a classification which is more similar to a person's intuition is possible.

Figure 7:
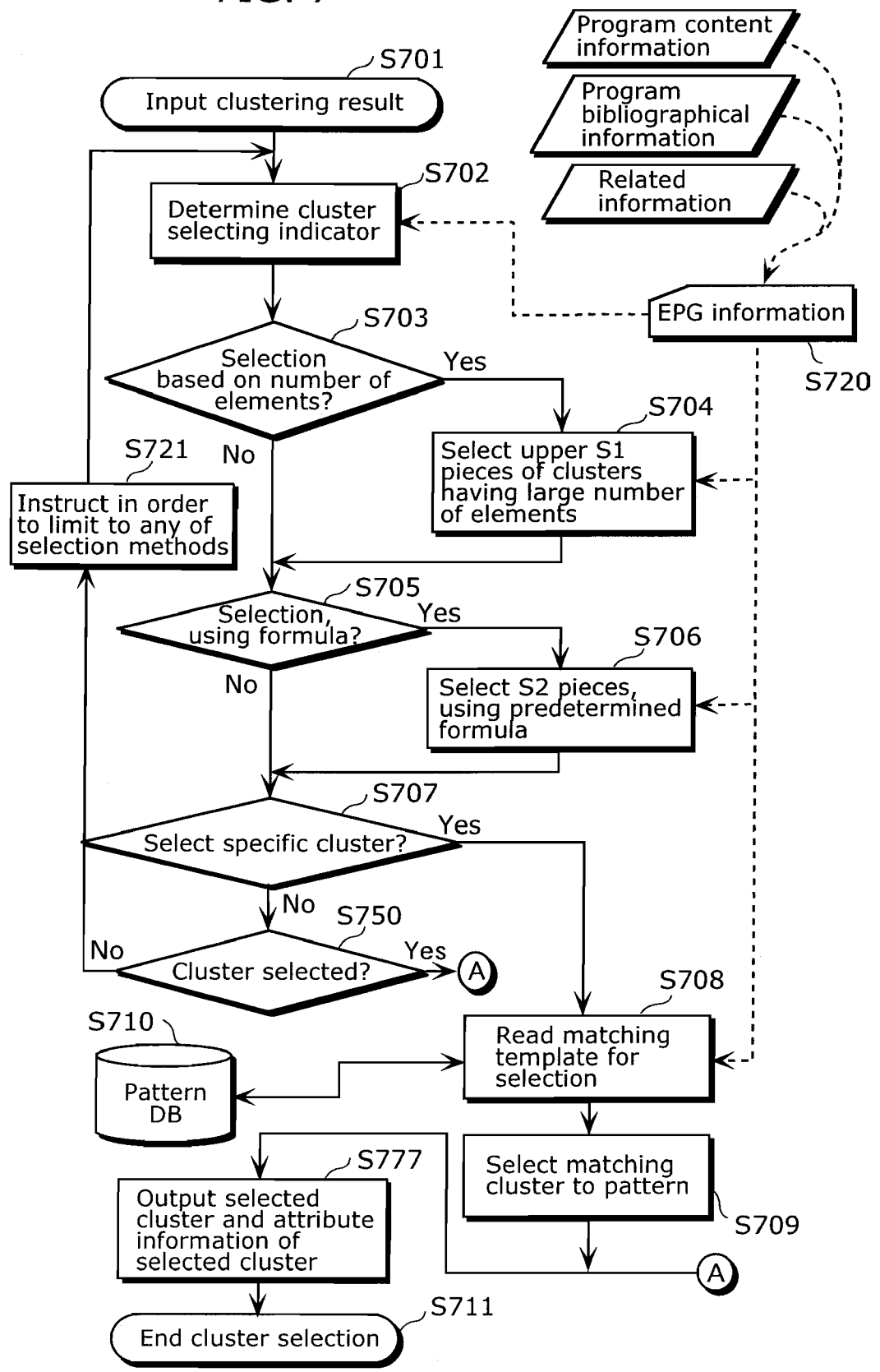
FIG. 7 is a flowchart showing conditions of internal operations of a cluster selecting unit.

Next, a function of cluster selecting unit 106 is described in detail (See FIG. 5 and FIG. 7).

FIG. 7 is a flowchart showing a condition of an internal operation of a cluster selecting unit 106.

When the clustering is finished in the picture classifying unit 104 (S701), a cluster selecting indicator is determined (S702). There are three main types of cluster selecting indicators: one of "selecting by the number of elements of a cluster," "selecting based on a predetermined formula for computation," and "selecting a specific cluster" is selected.

Here, when a selection is made based on the number of the elements of the cluster (S703: Yes), upper S1 pieces of clusters ranked high in the number of elements are selected (S704, S540) (for example, in the case of a baseball game, the clusters corresponds to the clusters in a pitching scene. In this case, S1 is 1, and one piece ranked highest is selected), proceeding to Step S705.

In the case where the selection is not made by the order of the number of the elements of the cluster (S703: No) and the selection is made based on the predetermined formula for computation (S705: Yes), S2 pieces of clusters are selected, using the predetermined formula for computation (S706).

The predetermined formula for computation (conditional equation) is, for example, described as follows. "When the number of elements of an i-th cluster Ci is Ri, clusters ranked within S2-th in the magnitude of Ri satisfying Th1<Ri<Th2 are selected." (This case corresponds to the case where, for example, a cluster which includes a cut picture having five through ten pieces of elements is selected. The predetermined formula for computation is effective when the total number of topics for organization of a program is roughly estimated, such as a questioning scene of a quiz show. From the title of the quiz show, the approximate number of questions is prospectively determined, then clusters having the corresponding numbers of elements to the number of questions are automatically selected.), then, proceeding to the next Step S707.

When the selection is made not out of the predetermined formula for computation (S705: Yes), but out of the specific cluster (S707: Yes), a matching template for selecting the cluster is read (S708). The template may be compiled in a database as a pattern DB, and stored or may be read out when necessary (S710). Using the read template, pattern matching is performed on each cluster, and a cluster having a pattern which matches the template is selected (S709). Then, the cluster selection is finished (S711).

Meanwhile, when the selection is not made out of a specific cluster (S707: No), the fact whether or not selection of any cluster has been made is determined (S750). In the case where the selection of any cluster has been made, Step S750 forwards to cluster selection finish (S711). In the case where nothing has been selected, feedback is given (S721) to a selection determining step (S702) in order to limit the selection methods to any of the three above mentioned selection methods.

Note that the pattern matching in the Step S709 may be performed on all the clusters or a part of clusters, or may be performed only on a part of pictures (representative pictures) in each cluster.

Furthermore, the program information 120, for example the program content information, the program bibliographical information, or the related information, may be obtained (S720), via the EPG information, to be used as auxiliary information for determining the cluster selecting indicator (S702), determining the kind of the template to be read (S708), and determining S1 and S2 (S704 and S706).

For example, when the genre of the program is specified as "baseball," using the program information 120, "selection is made based on the number of the elements of the cluster," and "S1 is set to 1" as mentioned above. When the genre is specified as a quiz program (in which approximately 10 quizzes are provided) as mentioned above, "selection is made based on the predetermined formula for computation." In the formula for computation, "Th1 is 7 and Th2 is 13", and a setting such as "S2 is 5" is possible.

Furthermore, in the Step S706, not only the number of the elements Ri but also time distribution may be used as the conditional equation. For example, when the conditional equation may be defined, assuming that: the time stamp on the j-th element (cut picture) Rij of the i-th cluster Ci is TRij; the minimum TRij on the time axis is MIN_TRij; and the maximum Trij is MAX_TRij, as follows: the duration of the main knitting of the program is T1 through T2, and an appearance time lag to the main knitting time (DIF1) is (MIN_TRij−T1)+ (T2−MAX_TRij). In this case, since a cluster which has a smaller DIF1 is selected, the cluster which perceives the feature of the whole program more than another cluster having the same number of cluster can be obtained.

On the contrary, another conditional equation, of which MIN_TRij and MAX_TRij are fit into predetermined time duration, may be determined. For example, a cluster which fits in the first 10 to 15 minutes in a one-hour program is selected. By selecting plural clusters in a program while changing time durations in this way, it is possible to select the clusters for appropriately providing indexes (chapters) in the program even though the program includes such program segments that are significantly different in contents from each other and have no similarity to each other.

Similarly, even in the case of a program such as a news program which includes scenes of an anchor person having a similarity and VTR scenes having no similarity, it is possible to easily assign chapters by combining homogeneous clusters in time distribution and clusters appearing locally in groups through the main knitting of the program.

In fact, when the after-mentioned Brick (chapter/index candidate) is generated, a decision has to be made either an effective group (indicating an area which an index is supposed to be assigned) to the chapter is generated or a not-effective group (indicating an area which an index is not supposed to be assigned) is generated. In the example of this news program, the clusters appearing locally in groups can be mentioned as the clusters for generating the "not-effective groups" which are not suitable to the index, and the homogeneous clusters in time distribution, the clusters which include cut pictures that do not belong to the "not-effective groups" are mentioned as the clusters that the index is supposed to be assigned.

Of course, a conditional equation is not limited to the above. As mentioned in the above example, any given conditional equation may be utilized as far as a hypothesis (assumption) of a possibly assumed program structure in general is mathematized, using the program information 120 as the auxiliary information. For example, on the time axis, by using distribution, dispersion, average, and a most frequent appearing time slot of the cut picture, a comparison to the program structure may be made in order to help select an appropriate cluster. Likewise, in the case of the number of the elements, by using the number of appearance cuts, a maximum number, and average, the comparison to the program structure may be made in order to help select an appropriate cluster.

Furthermore, a template to be used may be determined, using the program information 120. In the case of a program having a scene which includes a specific design and a layout, utilization of a fixed template is highly effective. In this case, since each cluster is appropriately classified by the picture classifying unit 104, just by performing matching on the representative picture of each cluster (an average picture, for example) and selecting the closest cluster, other cut pictures having another similar composition can be obtained at a time. The same result as the same matching is performed on the whole picture can be obtained just by performing the matching on the representative picture (the average picture, for example) of each cluster, thus resulting in a significant reduction of a calculation cost.

In Step S777, the selected cluster and attribute information of the selected cluster are outputted. Here, the "attribute information of the selected cluster" is information to indicate "whether or not the cluster is effective or not-effective for generating the Brick," or "whether or not the cluster is directly assigned with the index" when the cluster is selected.

A criterion for determining the attribute information is the same as a selection criterion, for the cluster itself, described in the news program and the baseball program mentioned above. When the cluster is "selected as the cluster for assigning the index appropriately by itself," attribute information, which informs, to the effect that "the cluster which is entitled of the index to be directly assigned" is assigned to the cluster for an output. The same goes for other attribute information.

Note that an operation regarding the Brick is described in the next indexing rule selecting unit 107 in detail, and then, a cluster selecting example for each Brick in the cluster selecting unit 106 is described.

In addition, the fact is said to be a rational hypothesis in that a more meaningful scene group and a shot group in terms of an organization of a program are more frequently used (broadcasted) than other scene groups and other shot groups. This is also the same as the case of an intention of a TV programmer who wants to structurally organize the program and inform a plot of the story. An introductory part and a bridge part in order to understand the content of the program are frequently repeated in terms of video grammar, and are considered organizing (the beginning and the starting position of an important part of) a segment and a scene of the program. Based on the feature in the organization of the program, the cluster selecting unit 106 can select the cluster.

Note that the number of the clusters to be selected may be obtained, for example, as follows.

A total broadcasting time of the program, including a commercial message, is set to Lp, and an average cut-appearance number in the program is set to Cr (when the cut picture is used). In the case where a cut number included in an i-th cluster Ci is NCi, the number of clusters, or the number of the pieces to be selected, may be obtained as a smallest positive integer k which satisfies the following:

$$\sum_{i=0}^{k} N_{C_i} > T_C \qquad \text{[Expression 2]}$$

Note that Tc is a threshold value, and is obtained by multiplying γ by Tp by Cr, setting γ as a parameter. γ is the parameter indicating to what degree particularly important cuts are included in the program.

Figure 9:
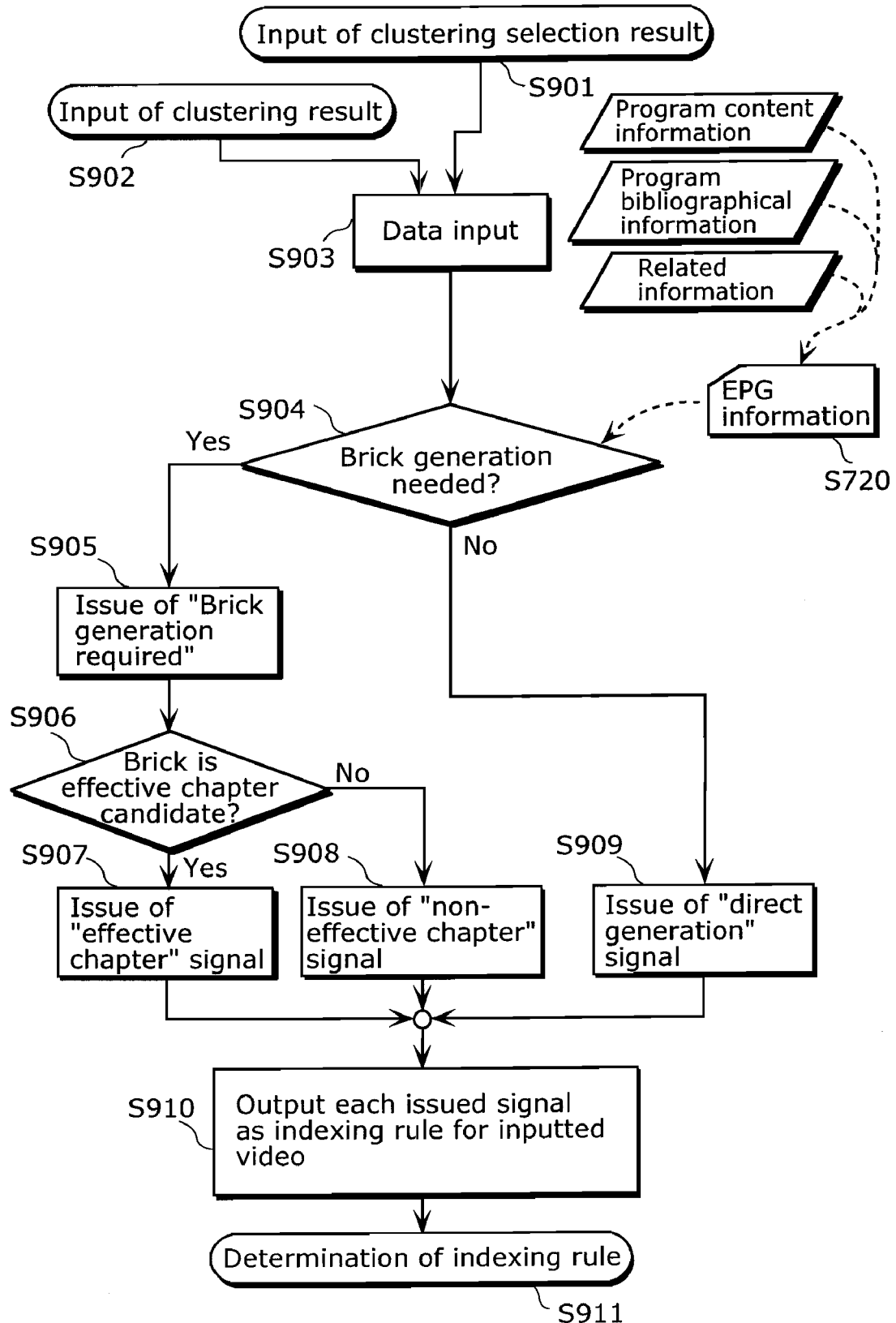
FIG. 9 is a flowchart showing conditions of internal operations of an index rule selecting unit.

Next, operations of the indexing rule selecting unit 107 are described in detail (See FIG. 5 and FIG. 9). In the later part, the cluster selecting example for each Brick in the cluster selecting unit 106 is described as well.

FIG. 9 is the flowchart showing the condition of an internal operation of the index rule selecting unit 107.

Upon receiving a data input (S903) indicating a clustering result (S902), first, the indexing rule selecting unit 107 judges whether or not generation of the Brick is necessary based on the number of the clusters to be used and the number of elements in the cluster (S904). Here, in the case where cut pictures in a selected cluster form a nearly temporally-consecutive group, the group is referred to as the Brick.

When the generation of the Brick is judged to be necessary, a signal for transmitting the fact, to the next stage, which the generation of the Brick is required is issued (S905/S543). Then, whether or not the Brick is an "effective" candidate or a "not-effective" candidate as a chapter is decided (S906), and when effective, an "effective chapter" signal is issued (S907). When not-effective, a "non-effective chapter" signal is issued (S908/S542). After that, each issued signal is outputted as an indexing rule for the inputted picture (S910/S511), and a determining process for the indexing rule is finished (S911).

Figure 11:
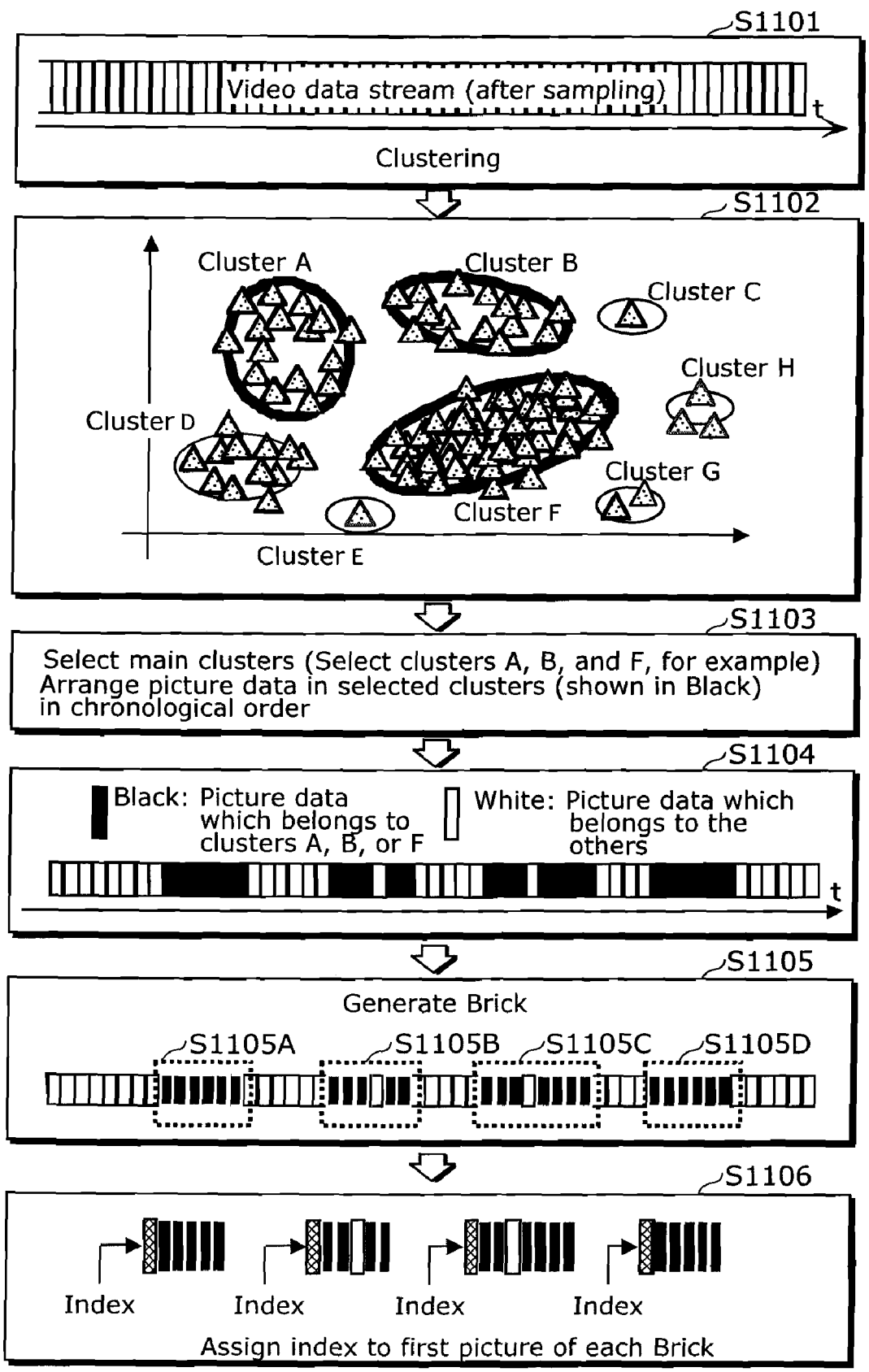
FIG. 11 is a schematic view showing a condition of an index being assigned by a valid Brick.

An outline of a chaptering rule using the Brick is described, using FIG. 11. Cut pictures are inputted as the video data (S1101) and clustered (S1102). Among clusters, suppose clusters A, B, and F are selected. Cut pictures in the selected clusters are arranged in chronological order of the original video data (S1103). Black data positions (black cut pictures) in S1104 correspond to data positions of the cut pictures which belong to one of clusters A, B, or F, and white parts (white cut pictures) correspond to the others. Here, four Bricks (groups) of S1105A, S1105B, S1105C, and S1105D, are generated.

A Brick generating algorithm here takes a relatively simple step of: recognizing a case in which the cut pictures in the selected clusters as mentioned above form the nearly temporally-consecutive group, as the Brick; and not recognizing as the Brick when inconsecutive. In specifying whether or not temporally consecutive, when one or more white cut pictures having predetermined time duration (Twh) or more are included between the black cut pictures as shown in FIG. 11, the black cuts do not form in the same Brick. In other words, as far as the black cut pictures appear more than Twh without a temporal gap, the cut pictures are considered as temporally consecutive.

This predetermined duration Twh is necessary when generating the index (necessary in the index generating unit 108); however, in the indexing rule selecting unit 107, the duration Twh does not have to be specified (In the indexing rule selecting unit 107, at least whether or not the generation of the Bricks is necessary may be determined as the rule).

Note that the examples of the generation of the Bricks (S1105) and the assignment of indexes (S1106) in FIG. 11 correspond to the case in which the effective chapter is selected in S907 of FIG. 9. As to be referred in the aftermentioned index generating unit 108, the indexes are assigned to the beginning (or to any given place of each Brick) of each Brick.

On the contrary, in the case of the "Bricks being the non-effective chapter" in Step S908, a cluster for generating non-effective Bricks and a cluster which does not generate the Bricks are selected in the cluster selecting unit 106 (In the case of a program, such as the news program mentioned above, in which there is no similarity in the VTR segment even though there is a similarity in the scene of the anchor person).

In terms of the Brick generating algorithm, the non-effective Bricks are no different from the effective Bricks. The non-effective Bricks are generated out of cut pictures which belong to the cluster for generating non-effective Bricks. Here, the cut pictures which belong to "a cluster selected as the cluster for generating non-effective Bricks" are referred to as significant cut pictures for convenience.

In the case of the "Bricks being the non-effective chapter," the indexes are assigned not to the non-effective Bricks but to the significant cut pictures. Out of the significant cut pictures, the indexes are not assigned to cut pictures included in each non-effective Brick.

Figure 14:
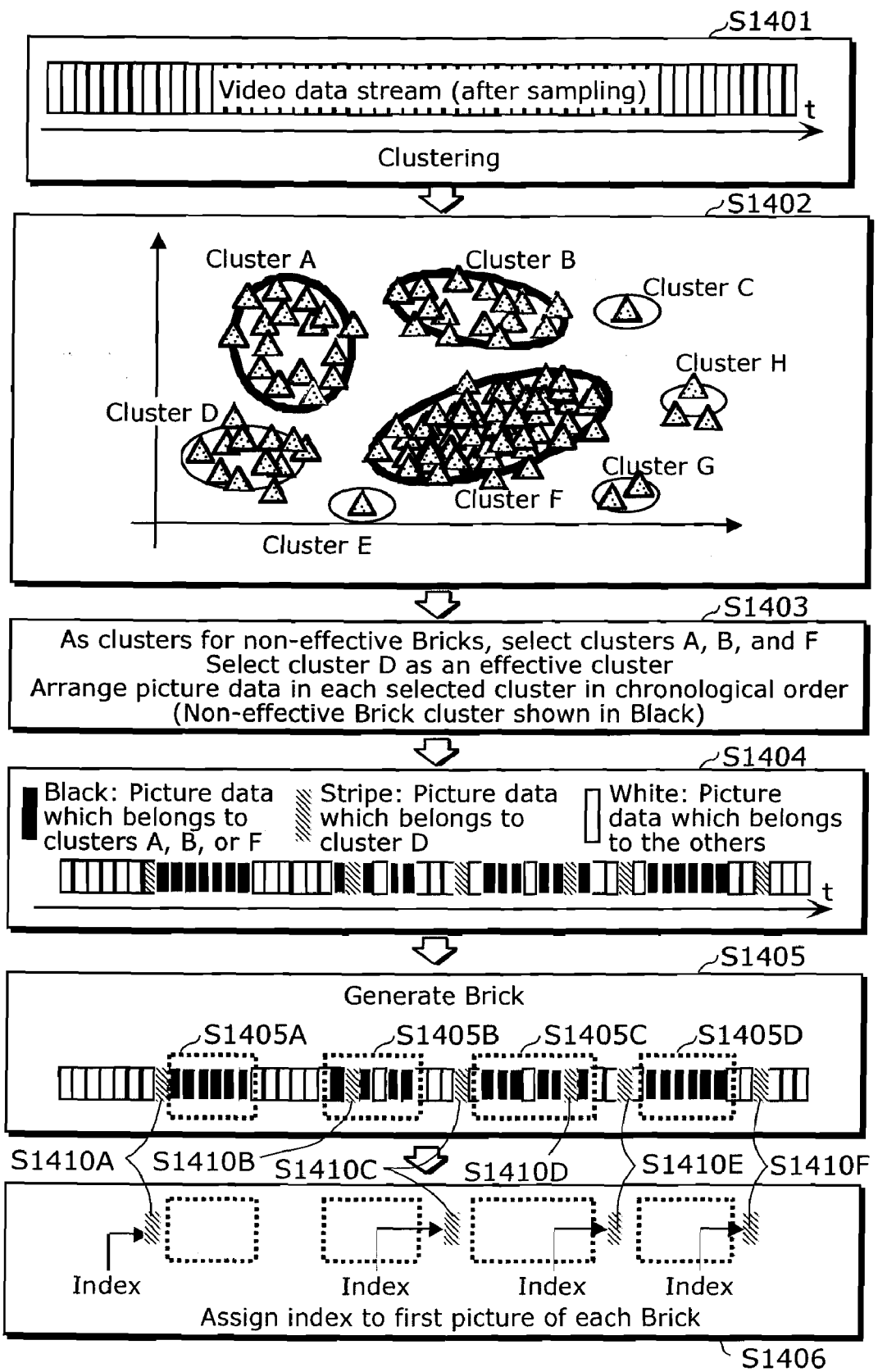
FIG. 14 is a schematic view showing a condition of an index being assigned by an invalid Brick.

Just as shown in FIG. 11, an outline of a chaptering rule using the non-effective Bricks is described, using FIG. 14. The cut pictures are inputted as the video data (S1401) and clustered (S1402). Among clusters, suppose clusters A, B, and F are selected as clusters generating non-effective Bricks, and a cluster D is selected as an effective cluster. The cut pictures in the selected clusters are arranged in chronological order of the original video data (S1403). Black data positions (black cut pictures) in Step S1404 correspond to data positions of the cut pictures which belong to one of non-effective Brick clusters A, B, or F. Striped data positions in black and white (pattern cut pictures) correspond to data positions of the significant cut pictures (six of the cut pictures, for example) in the cluster D. White parts (the white cut pictures) correspond to the others. Here, as for the index assignment to six significant cut pictures, S1410A, S1410B, S1410C, S1410D, S1410E, and S1410F, among the significant cut pictures, S1410B and S1410D included in non-effective bricks (Brick) each is not assigned with any index, but the remaining four cut pictures each is assigned with an index.

Here, as for the index assignment to six significant cut pictures S1410A, S1410B, S1410C, S1410D, S1410E, and S1410F, among the significant cut pictures, S1410B and S1410D included in non-effective Bricks each is not assigned with any index, but the remaining four cut pictures each is assigned with an index.

A determining method of the indexing rule when generating the Bricks in the indexing rule selecting unit 107 has been described above.

Next, the case where the generation of the Bricks is judged not to be necessary in Step S904 is described. In this case, a "direct generating" signal for direct assignment of the index to the cut picture in the selected cluster is issued (S909/S544), thus proceeding to Step S910.

Basically, the judgment whether or not the generation of the Bricks is necessary is determined based on selected information (such as this cluster is for the non-effective Bricks, and this cluster is for the effective cluster) in the cluster selecting unit 106. However, in the case where cluster specifying information in the cluster selecting unit 106 is missing for some reasons, as mentioned in S720 of the FIG. 7, the program content information, the program bibliographical information, or the related information may be inputted via the EPG information as the auxiliary information (S720). Whether or not the generation of the Bricks is necessary may be judged based on the auxiliary information.

As mentioned above, in the indexing rule selecting unit 107, based on the fact whether or not the generation of the Bricks is necessary, either the effective Bricks or the non-effective Bricks are determined to be generated when the generation of the Bricks is necessary. When generation of the Bricks is not necessary, a determination is made for direct generation.

The indexing rules which correspond to respective signals for "direct generation," "effective Brick generation," and "non-effective Brick generation" are compiled as follows.

Direct generation: the indexes are assigned to all the cut pictures included in the selected clusters.

Effective Brick generation: all the cut pictures included in the selected clusters are sorted according to the time axis, and the indexes are assigned on the group-by-group basis within the predetermined time.

Non-effective Brick generation: Among the cut pictures (the significant cut pictures) included in the predetermined clusters (significant clusters), the indexes are assigned to the cut pictures which are not included in the Bricks of the other predetermined clusters (non-effective clusters).

Note that, regarding how the clusters which generate the effective Bricks, the clusters which generates the non-effective Bricks, and the effective clusters to index assignment are selected, judgment is made based on the number of the elements in each cluster and the total number of elements as mentioned in the description of the cluster selecting unit 106. In addition, the fact that the situation in time distribution of each cluster and the program information 120, such as the EPG information, is utilized has also been mentioned above.

Again, in the case of a program, such as a news program, of which anchor person segments have a similarity even though VTR segments have no similarity, an easy chapter assigning can be performed by combining, throughout the program, homogeneous clusters in time distribution and clusters appearing locally in groups.

In other words, in the case of the news program, a method may be utilized, that is, the homogeneous clusters in time distribution are set to effective clusters to the chapters (clusters including significant cuts), and biased clusters in time distribution are set to the clusters for generating the non-effective Bricks.

In addition, in the case where the number of the cut pictures included in the top n-pieces (one piece, for example) of clusters accounts for a predetermined value (15%, for example) or more of the number of all the cut pictures, it is possible to use a method of selecting the clusters as clusters for direct generation. This method is particularly effective to sport programs, such as baseball. Needless to say, in this case as well, the top n-pieces may be unconditionally selected by obtaining information, a baseball program, from the program information 120. On the contrary, plural conditions, such as a baseball program having predetermined percentage and above, may also be made.

Furthermore, in the case where: the predetermined percentage for the total cut numbers accounts for less than the total cut numbers of the top n-pieces (10 pieces, for example) of clusters; and each cluster in a high order is biased in time distribution, a method may be utilized, that is, the top n-pieces of clusters and temporally biased each cluster are selected for generating "effective Bricks." This method is particularly effective to a variety program and a music program. In this case as well, the auxiliary information may be obtained from the program information 120, as the case of the example of the baseball.

Note that when one of the "direct generation," "effective Brick generation," or "non-effective Brick generation" is selected, suitable clusters to a pattern using a matching template in the cluster selecting unit 106 (S708 and S709) may also be used.

For example, when an index is desired to be assigned, without fail, to a specific scene, a cluster which matches a pattern of a template may be used for "direct generation." In the case where anchorperson scenes, which are not included in the non-effective Bricks, are collected in order to assign the index, the scenes may be collected by utilizing a template for an anchor person.

Note that, in the above description of FIG. 9, only the "direct generation," "effective Brick generation," and "non-effective generation" are described as index assigning rules. Meanwhile, these may be combined to define an index assigning rule. For example, the non-effective Bricks and the effective Bricks may be generated respectively, and the indexes may be assigned to the effective Bricks that do not overlap with (do not include/are not included in/do not share any part) the non-effective Bricks. Moreover, another rule to generate indexes hierarchically may be defined. For example, the "direct generation" may be used for indexes for a more detailed layer, and the "effective Brick generation" may be used for indexes for a rougher layer (in a higher order). When the index assigning rule is in a hierarchical structure, it is needless to say that information on each layer can be mutually used.

Note that not only the "direct generation," "effective Brick generation," and "non-effective Brick generation," but also another rule may be defined by simply designating and combining a cluster "to be used" and a cluster "not to be used." Each of the "direct generation," "effective Brick generation," and "non-effective Brick generation," is one of special cases in which the cluster "to be used" and the cluster "not to be used" are designated and combined.

Furthermore, the selection and combination rule of the cluster "to be used" and the cluster "not to be used" may be generated, using the program information 120 as the auxiliary information.

Note that the predetermined duration (Thw), or a threshold value for generating the Bricks, may be replaced with the number of the cut pictures (Nlim) which belong to the clusters that do not compose the Bricks. For example, when a continuable allowable limit (the number which other cuts can be continuously mixed) as one Brick is set to Nlim, Nlim may be obtained as a smallest positive integer which satisfies the following.

$$\left\{ 1.0 - \frac{\left(\sum_{i=0}^{k} N_{C_i}\right)}{\left(\sum_{i}^{all} N_{C_i}\right)} \right\}^{N_{lim}} < T_H \qquad \text{[Expression 3]}$$

When more than Nlim numbers of cut pictures, which belong to clusters other than k-pieces of clusters which constitute the Bricks, continuously appear in a certain Brick, the Brick is assumed to be divided. Note that $T_H$ is a threshold value, and setting $\eta$ as a parameter, $T_H$ can be obtained by dividing a product of $\eta$ and k by Cr·$\eta$ is the parameter which indicates to what degree insignificant cuts are included in a program. As with the aforementioned $\gamma$, an average value which is experimentally obtained from plural programs can be adopted as the value of $\eta$.

Figure 8:
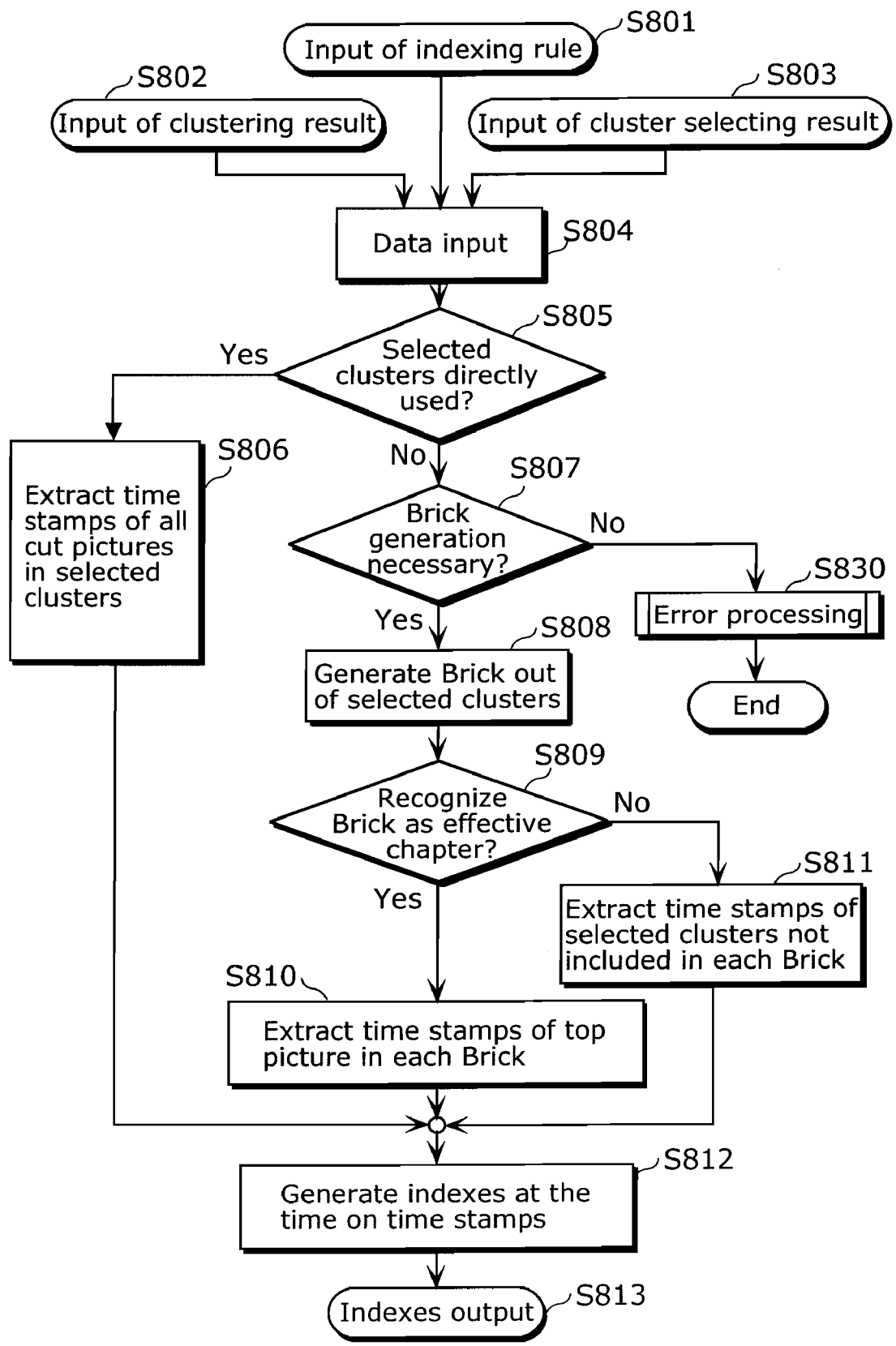
FIG. 8 is a flowchart showing conditions of internal operations of an index generating unit.

Next, the operations of the index generating unit 108 are described in detail (See FIG. 5 and FIG. 8).

FIG. 8 is a flowchart showing a condition of internal operations of the index generating unit 108.

After a data input (S804) by inputting the indexing rule (S801), inputting the clustering result (S802), and inputting a cluster selecting result (S803), generation of the indexes are actually performed, based on an issuing rule of the indexing rule. In the case where the direct generation signal is issued, the cut pictures of the selected clusters are directly used (S805: Yes). After the time stamps of all the cut pictures in the selected clusters are extracted (S806/S545), the indexes are generated according to each time of the extracted time stamp (S812), and outputted (S813).

In the case where the direct generation signal is not issued (S805: No), generation of the Bricks is fundamental. Thus, when a signal for generating the Bricks is not issued (S807: No), an error processing is performed (S830).

In the case where the signal for generating the Bricks is issued (S807: Yes), the effective Bricks or the non-effective Bricks are actually generated, using the selected clusters (S808). The generation method has already been described in the descriptions of the cluster selecting unit 106 and the indexing rule selecting unit 107.

Next, in the case where the generated Bricks are the effective chapters (S809: Yes/S548), or the effective Bricks for chapter generation (assignment of the indexes), time stamps on the beginning picture of each Brick are extracted (S810/

S546). Then the indexes are generated according to each time on the time stamps (S812), and outputted (S813).

Furthermore, in the case where the generated Bricks are the non-effective chapters (S809: No/S547), or the non-effective Bricks for chapter generation (assignment of the indexes), the time stamps of the cut pictures in the selected clusters which are not included in each Brick are extracted (S811/S547). Then the indexes are generated according to each time on the time stamps (S812), and outputted (S813).

Note that, in S810, the time stamps on the beginning picture of each Brick are extracted. In the meantime, any given timing in each Brick may be extracted as the time stamp.

In addition, an example of an algorithm for index generation is described above; however, the algorithm for index generation is not limited to this. Needless to say, as far as an algorithm actually executes a decided rule as the index rule, any given form can be assumed.

The above is the outline of the operation on the video scene classification device 100 in the first embodiment.

Note that, here is a comparison between conventional examples and the present invention for reference.

FIG. 1 shows a substantial rough processing step of a conventional example 1 (Patent reference 1). A video is segmented, and a similarity of a segment is measured by audio feature quantity and video feature quantity to perform clustering. Following that, clusters including mutually similar segments are searched to configure a similar chain.

As mentioned in the Problems that the Invention is to Solve, the problems are found in operability itself, as well as both accuracy and speed (suppose when applied to plural genres with the technical level of the time when the application has been filed, both of relevance rate and recall rate account for 30 to 50%); however, the conventional example 1 has the same objective as the present invention in terms of versatile assignment of indexes to a broadcast program, and thus is the document which represents the conventional technical level as an conventional example.

The conventional art is significantly different from the present invention, and the present invention is feasible as well as clearly different in configuration. Furthermore, the present invention has unique effects which the conventional example 1 fails to obtain, such as: having overwhelming superiority in obtained accuracy and speed; and, in addition, performing a robust classification on a ticker in a cut picture, the classification which can be performed in accordance with a human sense.

Figure 2:
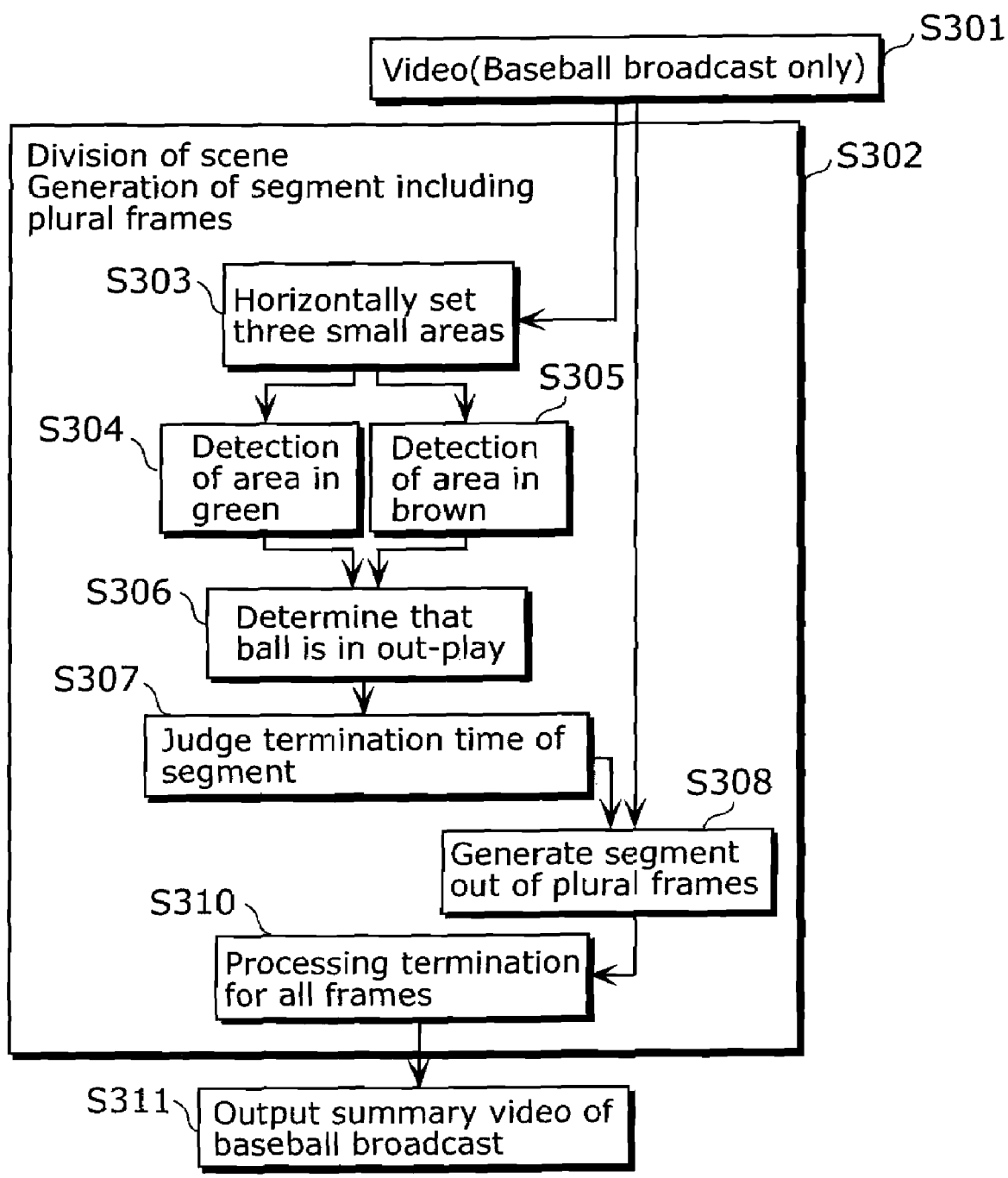
FIG. 2 is a diagram showing an outline of Conventional example 2.

FIG. 2 shows a substantial rough processing step of a conventional example 2 (Patent reference 2). By specifying a video genre, and then, in the case of baseball for example, by horizontally setting three small areas and then detecting areas in green and brown, an attempt to detect a pitching scene is made.

As mentioned in the Problems that the Invention is to Solve, the conventional example 2 has no versatility in genres and influenced with whether and ball parks. Furthermore, as shown in FIG. 12 having a large horizontal ticker, the conventional example 2 is of no use, as well (the figures shown before, that is, the recall rate is 98%, and the precision rate is 95%, are not for a cut picture group including a ticker). Empirically, in baseball cut pictures, plural captions and tickers are included at the rate of 20 to 30%. In this case, the recall rate in particular is estimated to significantly decline to approximately 60 to 80%.

As mentioned above, when implementation, the problems are lack of robustness to a video situation and versatility of genres; however, the conventional example 2 has the same objective as the present invention in terms of assigning an index to a broadcast program, and thus is the document which represents the conventional technical level as a conventional example.

The conventional example 2 is clearly different from the present invention in configuration. Furthermore, the present invention has unique effects which the conventional example 1 fails to obtain, such as: having overwhelming superiority in obtained accuracy; and, in addition, performing a robust classification on a ticker in a cut picture, the classification which can be performed in accordance with a human sense.

Figure 3:
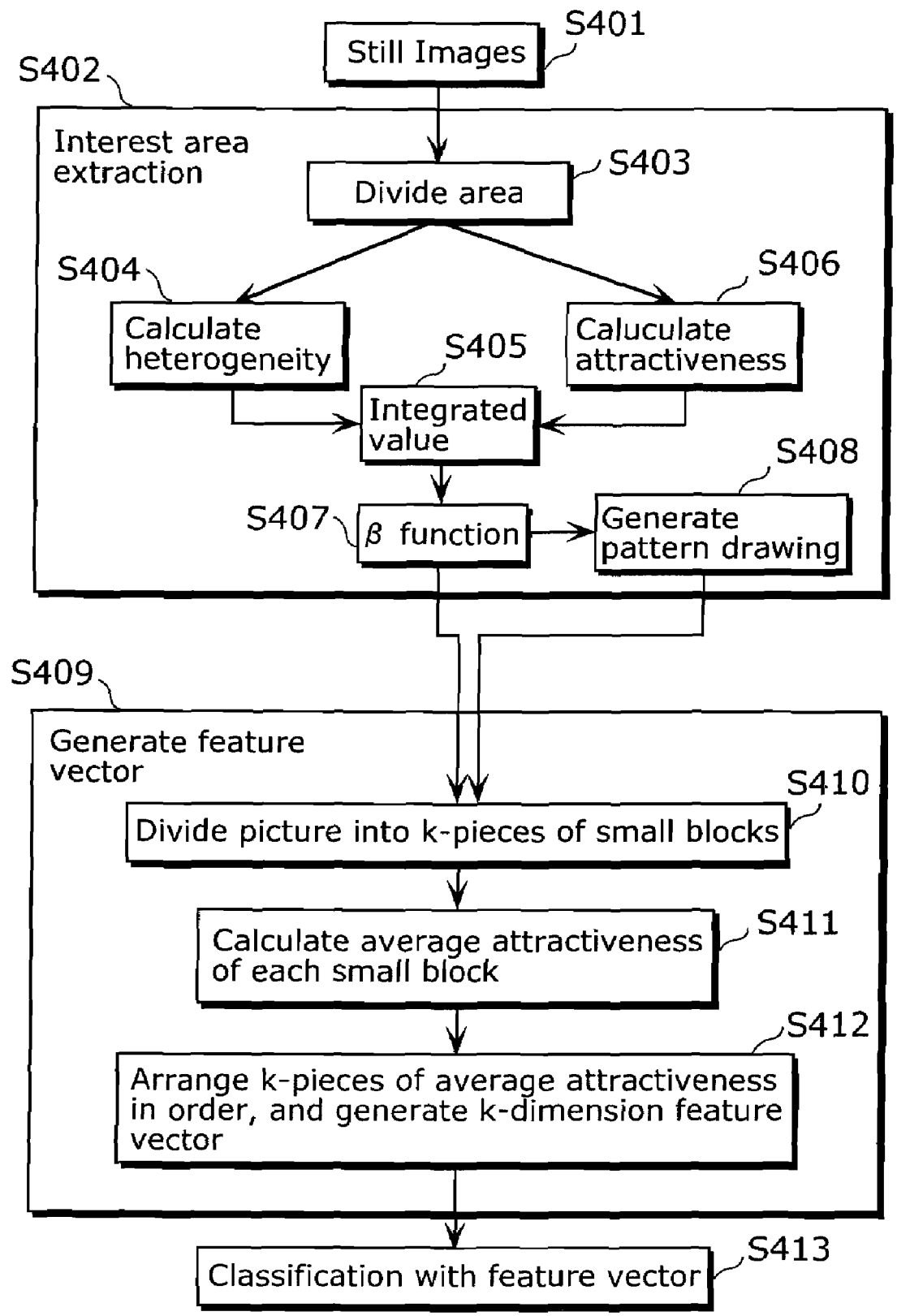
FIG. 3 is a diagram showing an outline of Conventional example 3.

FIG. 3 shows a substantial rough processing step of a conventional example 3 (Patent reference 3). Pictures are divided into areas, and for a form of each region, heterogeneity of the form is calculated. Furthermore, attractiveness is calculated out of color feature quantity in particular (Chiefly, red is defined to be the most appealing color, and by measuring color distance from red, the attractiveness is calculated). The area which draws the most interest among the divided areas is determined based on the heterogeneity and the attractiveness. Furthermore, the pictures are separately divided into small blocks, and an average value of the attractiveness is obtained on the small block-by-small block basis, and a k-dimensional feature vector having the attractiveness with plural pieces (k-pieces, for example) of small blocks is generated, the attractiveness which is arranged in order. Then, the pictures are classified by the feature vector.

This conventional example 3 is not intended for chapter generation but for allowing a search, when searching the pictures, which is specified to a characteristic part in the pictures. For example, when a user searches for a "picture in which a flower is featured" through key pictures, the conventional example 3 argues that evaluation of similarity according only to the characteristic part (the part that the flower is in), rather than evaluation of similarity based on the whole picture, is better since abiding by an actual condition in which the user desires to search.

The conventional example 3 is similar to the present invention in a comprehensive point of view, that is, in similarity classification of pictures to be classified, a classification is performed with human perceptual characteristics considered. However, the present invention does not perform searching a featured subject. On the contrary, an area having a relatively universal feature is calculated.

In the case where the conventional example 3 is applied to a baseball broadcast, for example, suppose a batter in a cut picture 1202 of FIG. 12 is wearing a red uniform. In the cut picture 1202, only an outline of the batter is detected as an interest area. In general, players in the same team are in uniforms having the same color, and thus not just for a pitching scene, the cut pictures, showing a player who is wearing a uniform colored in the same red, are easily assumed to share a high similarity, and to be classified in the same category. Moreover, when a player introductory caption in a cut picture 1203 has a red background, only the player introductory caption is detected as the interest area in the cut picture 1203. The cut picture 1203 and the cut picture 1202 are easily assumed not to be classified in the same category.

Furthermore, when the offensive side and the defensive side are switched, the colors of the uniforms are switched. Thus, in a mere case of pitching scenes, it is very difficult to classify all the pitching scenes into the same category, and it is predictable that cut pictures other than the pitching scenes are frequently misclassified or mixed into the category for pitching scenes.

In other words, the conventional example 3 and the present invention are clearly different in configuration. Furthermore, in terms of obtained accuracy observed based only on the classification, the present invention enjoys significant superiority. Moreover, a unique effect which the conventional example 3 does not have is included in that a robust classification can be performed on a ticker in a cut picture.

Note again that in order to improve classification accuracy, in the conventional art, an approach, which specifies the feature quantity used for the classification after limiting the kinds of the cut pictures, is adopted. For example, after setting a limitation, such as a baseball broadcast, a classification has been performed, using feature quantity which is specialized in the baseball broadcast.

On the contrary, in the case of another conventional classification method which does not perform the limitation, there are problems in a basic classification performance, such that, among clusters generated through the classification, cut pictures which should be in the same cluster belong to different clusters, and cut pictures which should belong to different clusters belong to the same cluster. Since a following process absorbs the generated clusters, blanket processing needs to be performed, thus there are problems to be repeatedly noted both in accuracy and speed.

The above is the comparison between the present invention and the conventional examples.

Note that superiority based on an objective experimental data is also confirmed. The data is posted as follows.

When indexing is performed based on the configuration in the present invention, in the case of a baseball broadcast, for example, the precision rate of the pitching scene is 99.6% or more on average. This is the figure covering through the baseball broadcast including commercial messages. Furthermore, the figure is from a test which takes an actual application into account, using a broadcast under a relatively bad condition (Three baseball broadcasts are used for the test. One of the broadcasts is a video that the sky is clear and bright at the beginning of the game. Then the whether gets cloudy and dark, and it starts to snow in the middle of the game. Since the snowfall is so heavy that the image turns up to be whitened for a while. Moreover, another one is a video showing a change from a clear sky to a heavy rainfall in the later half of the game. As a matter of course, the cases cause a debacle with a conventional clustering method which lacks robustness. Despite a system specialized in baseball, such as the Patent reference 2, the cases result in a debacle since color information is lost).

Furthermore, a good result is obtained from another genre of programs. Processing time has been approximately 45 seconds (3 GHz CPU) out of an approximately 100 minute (1411 cut pictures)-baseball video. This processing time is a total amount of time including reading of the cut pictures, determining areas to be processed, clustering, and indexing.

As mentioned above, the present invention is clearly different from the conventional examples in configuration, and furthermore, can achieve accuracy and speed which the technical level of conventional art has never arrived at. Moreover, the present invention is confirmed having a unique effect which has not conventionally existed.

Note that, in the above, the classification of the broadcast content and the assignment of the indexes are mainly described; however, a data which is subject to classification is not only limited to the broadcast content, but also may be any given picture data.

In particular, the present invention is highly effective to a personal content (a picture group photographed, using a digital camera) mainly including still pictures. For example, according to this scheme, it is possible to classify the pictures taken at the time when the same location is visited several times into the same category and assign the same tag to (perform indexing on) each of the pictures with the present method, pictures of the same location which is visited plural times can be classified in the same category and have the same tag (The indexing is performed).

In the case of a picture group which is shot by means of intermittent shooting and continuous shooting, the advantage becomes greater. On classifications of the personal content in the above conventional art, most of the classifications take advantage of variation in shooting times, thus a classification with high consent based on a visual feature of the picture cannot be performed. Furthermore, since the shooting is performed at regular intervals for the continuously obtained picture group, the temporal variation which the conventional art depends on cannot be used. Thus, the classifications in the conventional art result in a near debacle.

However, by means of the present method, despite a still picture group which is shot at a discrete time interval (personal photos of every travel) and a picture group which is shot at a regular time interval (such as a monitoring camera video, a personal video image, and a personal recording picture), indexing based on the visual feature can be performed. As a result, the advantage of the present method becomes greater.

For example, by using a camera which can perform the intermittent shooting (for example, a picture which is shot at an interval of one piece a second), a situation of accumulating several hours to several days' worth of a lot of still pictures is considered. Specifically, the pictures may be from the monitoring camera, or the pictures may be shot for a travelogue by an individual who carries a camera. Such a desire of automatically organizing and assigning indexes to a large number of pictures is considered to occur as a natural motivation.

Considering a personal travel, pictures change little by little when shot under: changing scenery at a travel destination (in a mountain area, on the sea shore, or in a city); changing whether; and changing conditions whether or not indoor or outdoor. In these pictures, a large change does not practically occur within a short period of time (from several seconds to several minutes), and the pictures are more or less perceived as similar scenes. From a view point of a computer vision, however, classifying scenes which appear similar to human eyes into the same category is generally difficult. This is the same case where whether or not there is a ticker or there is a slight difference in an existing ticker in the broadcast content mentioned above becomes an impediment for classification in the conventional art. Among a large number of natural pictures (personal content), classifying natural pictures having a partly similar atmosphere into the same category as "similar," based on the picture information, is very difficult.

Thus, the classification method in the present invention is introduced. Thanks to the present method, a classification based on a person's visual feature quantity becomes possible. Since influence of picture information on a visually unimportant part (a non-interest area) can be reduced, a picture group which is closer to a person's intuition and is considered "similar" can be indexed as a group (cluster).

Obviously, a tag may be assigned to a picture which belongs to each cluster.

Thus, a data which is subject to the classification is not only limited to the broadcast content, but may be any given picture data.

Note that, here, the intermittently shot pictures of the personal travel are taken into consideration; however, needless to say, an embodiment is not limited to the above, and any given still picture and a moving picture may be covered.

As mentioned above, the present invention allows construction of a versatile and fast chaptering system which generates an index (chapter) clear to the user according to a new video classification method which does not specify an object (not a top-down style) and provides constant classification results which seem natural. Thus, construction of a comfortable video reproducing and searching system is possible.

The present invention can be applied to recording and reproducing apparatuses, such as TVs, cellular phones, car navigation systems, and DVD players, as well as video recorders (HDD recorders and DVD recorders). Moreover, the present invention can be also used as server client systems in each of which the server performs chaptering on video and delivers the video with data to the client apparatus.

The invention claimed is:

1. A video scene classification device which assigns an index to one or more pictures among pictures which compose a video, the video scene classification device comprising:
 a video sampling unit operable to obtain pictures which are part of the pictures which compose the video, by sampling;
 a processing area determining unit operable to determine, for each of the pictures obtained by the video sampling unit, an area on which image processing is performed;
 a picture classifying unit operable to perform the image processing on the area of each of the pictures determined by the processing area determining unit to calculate a classification indicator which is used as an indicator for clustering, and classify the part of the pictures into clusters based on the classification indicator, the classification indicator including a feature of the part of the pictures;
 a cluster selecting unit operable to select at least one cluster among the clusters classified by the picture classifying unit;
 an indexing rule selecting unit operable to select an indexing rule based on one of the classification indicator and program content information of the video, the indexing rule being a rule for assigning an index to the part of the pictures; and
 an index generating unit operable to assign the index to at least one picture among the pictures which compose the selected cluster, using the selected indexing rule,
 wherein, based on the program content information, the indexing rule selecting unit is operable to select one of:
 (1) assigning the index to at least the one or more pictures included in the selected cluster;
 (2) sorting the at least one picture included in the selected cluster according to a time axis, and assign the index to every picture group within a predetermined time period; and
 (3) assigning the index to a video block, among video blocks included in a predetermined cluster, which has not been included in a continuous group due to another predetermined cluster.

2. The video scene classification device according to claim 1,
 wherein, based on the program content information, the indexing rule selecting unit is further operable to select one of:
 (1) assigning the index to all the pictures included in the selected cluster;
 (2) sorting all the pictures included in the selected cluster according to a time axis, and assign the index to every picture group within a predetermined time period; and
 (3) assigning the index to the video block, among the video blocks included in the predetermined cluster, which has not been included in the continuous group due to another predetermined cluster.

3. The video scene classification device according to claim 1,
 wherein the cluster selecting unit includes at least one of:
 a cluster number determining unit operable to determine a number of clusters to be selected; and
 a cluster kind determining unit operable to determine a kind of the clusters to be selected,
 the cluster number determining unit is operable to determine the number of the clusters based on one of the following operations to:
 (1) specify a genre of the video from one of the program content information and picture information, and determine a predetermined number which corresponds to the specified genre as the number of the clusters to be selected; and
 (2) specify the genre of the video from one of the program content information and the picture information, and determine the predetermined number, as the number of the clusters to be selected, which is determined based on the determined genre and a classification result in the picture classifying unit, and
 the cluster kind determining unit is operable to determine the kind of the clusters based on one of the following operations to:
 (1) select a predetermined number of pictures from a cluster having a largest number of the video blocks in the cluster;
 (2) select the predetermined number of the pictures from a cluster having an appearance time average value of the video block in the cluster, the appearance time average value being close to a predetermined time point;
 (3) select the predetermined number of the pictures from a cluster having an appearance time distribution of the video block in the cluster, the appearance time distribution being close to a predetermined time slot; and
 (4) select the predetermined number of the pictures from a cluster having an appearance time distribution of the video block in the cluster, the appearance time distribution being not included in the predetermined time slot.

4. The video scene classification device according to claim 1,
 wherein the processing area determining unit is operable to determine the area on which the image processing is performed by using one of luminance information and color information of the pictures in the video, or determine an area on which the image processing is performed, by using the program content information, based on one of the following operations to:
 (1) perform weighting on a value indicating a position in determining the area on which the image processing is performed; and
 (2) estimate a position in which a caption or a ticker appears, and perform weighting on the value indicating the position.

5. The video scene classification device according to claim 4,
 wherein, when the program content information is referred to as information about a baseball program, the processing area determining unit is operable to set a weight value associated with a center of each of the pictures, or estimate the position of the caption, based on a score display position and a player introduction display position.

6. The video scene classification device according to claim 1,
wherein the picture classifying unit is operable to perform a classification of the clusters, by using a histogram of color information of the pictures or a histogram of luminance information of the pictures for the classification, by using either:
(1) a size or a location of an area on which the image processing is performed; or
(2) picture information within the area on which the image processing is performed, picture information of a predetermined peripheral area in the area on which the image processing is performed, or picture information outside the area on which the image processing is performed.

7. The video scene classification device according to claim 6,
wherein the picture classifying unit is operable to:
perform classification of first pictures, based on a value of difference between values of the area on which the image processing is performed in each of the pictures; and perform classification of second pictures based on a histogram of color information in a peripheral area in the area on which the image processing is performed or a histogram of luminance information in the peripheral area in the area on which the image processing is performed.

8. A video scene classification method which assigns an index to one or more pictures among pictures which compose a video, the video scene classification method comprising:
a video sampling step of obtaining pictures which are part of the pictures which compose the video, by sampling;
a processing area determining step of determining, for each of the pictures obtained by the video sampling step, an area on which image processing is performed;
a picture classifying step of performing the image processing on the area of each of the pictures determined by the processing area determining step to calculate a classification indicator which is used as an indicator for clustering, and classifying the part of the pictures into clusters based on the classification indicator, the classification indicator including a feature of the part of the pictures;
a cluster selecting step of selecting at least one cluster among the clusters classified by the picture classifying step;
an indexing rule selecting step of selecting an indexing rule based on one of the classification indicator and program content information of the video, the indexing rule being a rule for assigning an index to the part of the picture; and
an index generating step of assigning the index to at least one picture among the pictures which compose the selected cluster, using the selected indexing rule,
wherein, based on the program content information, the indexing rule selecting step includes one of:
(1) assigning the index to at least one picture included in the selected cluster;
(2) sorting the at least one picture included in the selected cluster according to a time axis, and assign the index to every picture group within a predetermined time period; and
(3) assigning the index to a video block, among video blocks included in a predetermined cluster, which has not been included in a continuous group due to another predetermined cluster.

9. A non-transitory computer-readable recording medium storing a program for use with a video scene classification device which assigns an index to one or more pictures among pictures which compose a video, the program causing a computer to execute steps comprising:
a video sampling step of obtaining pictures which are part of the pictures which compose the video, by sampling;
a processing area determining step of determining, for each of the pictures obtained by the video sampling step, an area on which image processing is performed;
a picture classifying step of performing the image processing on the area of each of the pictures determined by the processing area determining step to calculate a classification indicator which is used as an indicator for clustering, and classifying the part of the pictures into clusters based on the classification indicator, the classification indicator including a feature of the part of the pictures;
a cluster selecting step of selecting at least one cluster among the clusters classified by the picture classifying step;
an indexing rule selecting step of selecting an indexing rule based on one of the classification indicator and program content information of the video, the indexing rule being a rule for assigning an index to the part of the pictures; and
an index generating step of assigning the index to at least one picture among the pictures which compose the selected cluster, using the selected indexing rule,
wherein, based on the program content information, the indexing rule selecting step includes one of:
(1) assigning the index to at least one picture included in the selected cluster;
(2) sorting the at least one picture included in the selected cluster according to a time axis, and assign the index to every picture group within a predetermined time period; and
(3) assigning the index to a video block, among video blocks included in a predetermined cluster, which has not been included in a continuous group due to another predetermined cluster.

10. An integrated circuit which assigns an index to one or more pictures among pictures which constitute a video, the integrated circuit comprising:
a video sampling unit operable to obtain pictures which are part of the pictures which compose the video, by sampling;
a processing area determining unit operable to determine, for each of the pictures obtained by the video sampling unit, an area on which image processing is performed;
a picture classifying unit operable to perform the image processing on the area of each of the pictures determined by the processing area determining unit to calculate a classification indicator which is used as an indicator for clustering, and classify the part of the pictures into clusters based on the classification indicator, the classification indicator including a feature of the part of the pictures;
a cluster selecting unit operable to select at least one cluster among the clusters classified by the picture classifying unit;
an indexing rule selecting unit operable to select an indexing rule based on one of the classification indicator and program content information of the video, the indexing rule being a rule for assigning an index to the part of the pictures; and
an index generating unit operable to assign the index to at least one picture among the pictures which compose the selected cluster, using the selected indexing rule, wherein, based on the program content information, the indexing rule selecting unit is operable to select one of:
(1) assigning the index to at least one picture included in the selected cluster;
(2) sorting the at least one picture included in the selected cluster according to a time axis, and assign the index to every picture group within a predetermined time period; and
(3) assigning the index to a video block, among video blocks included in a predetermined cluster, which has not been included in a continuous group due to another predetermined cluster.

11. A server client system which includes a server apparatus and a client apparatus,
wherein the server apparatus includes:
a video sampling unit operable to obtain pictures which are part of the pictures which compose the video, by sampling;
a processing area determining unit operable to determine, for each of the pictures obtained by the video sampling unit, an area on which image processing is performed;
a picture classifying unit operable to perform the image processing on the area of each of the pictures determined by the processing area determining unit to calculate a classification indicator which is used as an indicator for clustering, and classify the part of the pictures into clusters based on the classification indicator, the classification indicator including a feature of the part of the pictures;
a cluster selecting unit operable to select at least one cluster among the clusters classified by the picture classifying unit;
an indexing rule selecting unit operable to select an indexing rule based on one of the classification indicator and program content information of the video, the indexing rule being a rule for assigning an index to the part of the pictures; and
an index generating unit operable to assign the index to at least one picture among the pictures which compose the selected cluster, using the selected indexing rule,
wherein, based on the program content information, the indexing rule selecting unit is operable to select one of:
(1) assigning the index to at least one picture included in the selected cluster;
(2) sorting the at least one picture included in the selected cluster according to a time axis, and assign the index to every picture group within a predetermined time period; and
(3) assigning the index to a video block, among video blocks included in a predetermined cluster, which has not been included in a continuous group due to another predetermined cluster, and
the client apparatus includes:
a receiving unit operable to receive picture data from the server apparatus; and
a reproducing unit operable to reproduce a picture along with one of cuing and skipping when reproducing the picture in the received picture data based on an index in the received picture data.

* * * * *